US012343980B2

(12) United States Patent
Livingston

(10) Patent No.: US 12,343,980 B2
(45) Date of Patent: Jul. 1, 2025

(54) SECONDARY MOVING TAG PLATEN DEVICE FOR A PRINTING PLATEN

(71) Applicant: Livingston Systems, LLC, Denver, CO (US)

(72) Inventor: Darren Livingston, Arvada, CO (US)

( * ) Notice: Subject to any disclaimer, the term of this patent is extended or adjusted under 35 U.S.C. 154(b) by 0 days.

(21) Appl. No.: 18/487,285

(22) Filed: Oct. 16, 2023

(65) Prior Publication Data

US 2024/0123725 A1 Apr. 18, 2024

Related U.S. Application Data

(60) Provisional application No. 63/379,868, filed on Oct. 17, 2022.

(51) Int. Cl.

| | |
|---|---|
| ***B41F 15/18*** | (2006.01) |
| ***B41F 1/38*** | (2006.01) |
| ***B41F 1/56*** | (2006.01) |
| ***B41J 3/407*** | (2006.01) |

(52) U.S. Cl.

CPC .................. *B41F 1/38* (2013.01); *B41F 1/56* (2013.01); *B41F 15/18* (2013.01); *B41J 3/4078* (2013.01)

(58) Field of Classification Search

USPC .......................................................... 101/474

See application file for complete search history.

(56) References Cited

U.S. PATENT DOCUMENTS

| | | | |
|---|---|---|---|
| 3,783,073 | A | 1/1974 | Wamberg |
| D246,083 | S | 10/1977 | Auersperg |
| 4,058,055 | A | 11/1977 | Douglas |
| 4,287,826 | A | 9/1981 | Brabec |
| 4,753,164 | A | 6/1988 | Barnes |
| 4,819,559 | A | 4/1989 | Szarka |
| 4,846,058 | A | 7/1989 | Farris |
| 4,908,912 | A | 3/1990 | Grant |
| 4,930,413 | A | 6/1990 | Jaffa |
| 5,107,758 | A | 4/1992 | Withers |

(Continued)

FOREIGN PATENT DOCUMENTS

| | | |
|---|---|---|
| JP | 6004169 B2 | 10/2016 |
| JP | 6015906 B2 | 10/2016 |

(Continued)

OTHER PUBLICATIONS

"Tag Along" dated Oct. 18, 2014, Available from the Internet at https://www.youtube.com/watch?v=-3KWYB9gmLAat least as early as May 5, 2016.

(Continued)

*Primary Examiner* — Leslie J Evanisko

(74) *Attorney, Agent, or Firm* — Trenner Law Firm, LLC; Mark Trenner

(57) ABSTRACT

A secondary moving tag platen device is disclosed as it may be implemented for a shirt printing platen. An example of the secondary moving tag platen device includes a tag platen or tag surface and a handle. The handle is rotated between an open position and a closed position. An indexing mechanism rotates the tag platen in conjunction with rotation of the handle. The tag platen moves to a shirt loading/unloading position when the handle is moved to the open position, and the tag platen moves to a tag printing position when the handle is moved to the closed position.

19 Claims, 30 Drawing Sheets

(56) References Cited

U.S. PATENT DOCUMENTS

| | | | | |
|---|---|---|---|---|
| 5,161,466 | A | 11/1992 | Burris | |
| 5,199,353 | A * | 4/1993 | Szyszko | B41F 17/005 101/474 |
| 5,226,362 | A | 7/1993 | Iaccino et al. | |
| 5,247,885 | A * | 9/1993 | Laccino | B41F 15/22 101/474 |
| 5,327,827 | A | 7/1994 | Richardson | |
| 5,784,956 | A | 7/1998 | Walz | |
| 6,631,985 | B2 | 10/2003 | Koizumi | |
| 6,640,714 | B1 | 11/2003 | Papa | |
| 6,651,554 | B1 | 11/2003 | Williams | |
| 7,413,301 | B2 | 8/2008 | Niimi | |
| D648,784 | S | 11/2011 | Horito | |
| D702,529 | S | 4/2014 | Herrera | |
| 9,302,462 | B2 | 4/2016 | Livingston | |
| D765,775 | S | 9/2016 | Livingston | |
| 9,849,665 | B2 | 12/2017 | Livingston | |
| 10,189,278 | B1 | 1/2019 | Friedrich et al. | |
| 10,479,070 | B2 | 11/2019 | Livingston | |
| 11,491,777 | B2 | 11/2022 | Livingston | |
| 2004/0000240 | A1 | 1/2004 | Oleson | |
| 2004/0189776 | A1 | 9/2004 | Niimi | |
| 2005/0278984 | A1 | 12/2005 | Kenney | |
| 2006/0203069 | A1 | 9/2006 | Niimi et al. | |
| 2013/0057632 | A1 | 3/2013 | Moriya | |
| 2013/0336702 | A1 | 12/2013 | Yanagishita | |
| 2015/0360460 | A1 * | 12/2015 | Livingston | B41F 15/28 347/110 |
| 2016/0159075 | A1 | 6/2016 | Livingston | |
| 2018/0072044 | A1 | 3/2018 | Livingston | |
| 2018/0333949 | A1 | 11/2018 | Edwards | |
| 2022/0212462 | A1 * | 7/2022 | Friedrich | B41J 11/002 |
| 2022/0288918 | A1 | 9/2022 | Yardley | |

FOREIGN PATENT DOCUMENTS

| | | |
|---|---|---|
| WO | WO2020227311 | 11/2020 |
| WO | WO2021250659 | 12/2021 |

OTHER PUBLICATIONS

Screenshots of website http://littlesistersystem.com/ and corresponding videos linked from this website. Videos uploaded Feb. 18, 2013 and May 25, 2009, respectively, 3 pages total.

* cited by examiner

SECONDARY MOVING TAG PLATEN DEVICE FOR A PRINTING PLATEN

PRIORITY CLAIM

This application claims the priority filing benefit of U.S. Provisional Patent Application No. 63/379,868 filed Oct. 17, 2022 for "Shirt Printing Platen With Secondary Moving Tag Platen" of Darren Livingston, hereby incorporated by reference in its entirety as though fully set forth herein.

BACKGROUND

Printed t-shirts is a big consumer industry, including t-shirts for concerts, events, travel destinations, and everyday designs and slogans. New t-shirts are typically placed on a platen to stretch and hold the chest area flat for screen printing, direct-to-garment, and other decorating processes. Most t-shirts also include a label area on the back inside neck portion of the t-shirt. The label may include size, manufacturer, material of manufacture and/or other information. These labels may be printed separate from or as a part of screen printing, direct-to-garment, and other decorating processes. Some t-shirt decorating processes leave the ink wet on the shirt until it is moved to a curing station, often a conveyor oven or heat press. Unloading a standard platen can cause the neck tag to smear the other side of the t-shirt.

DETAILED DESCRIPTION

Figure 1:
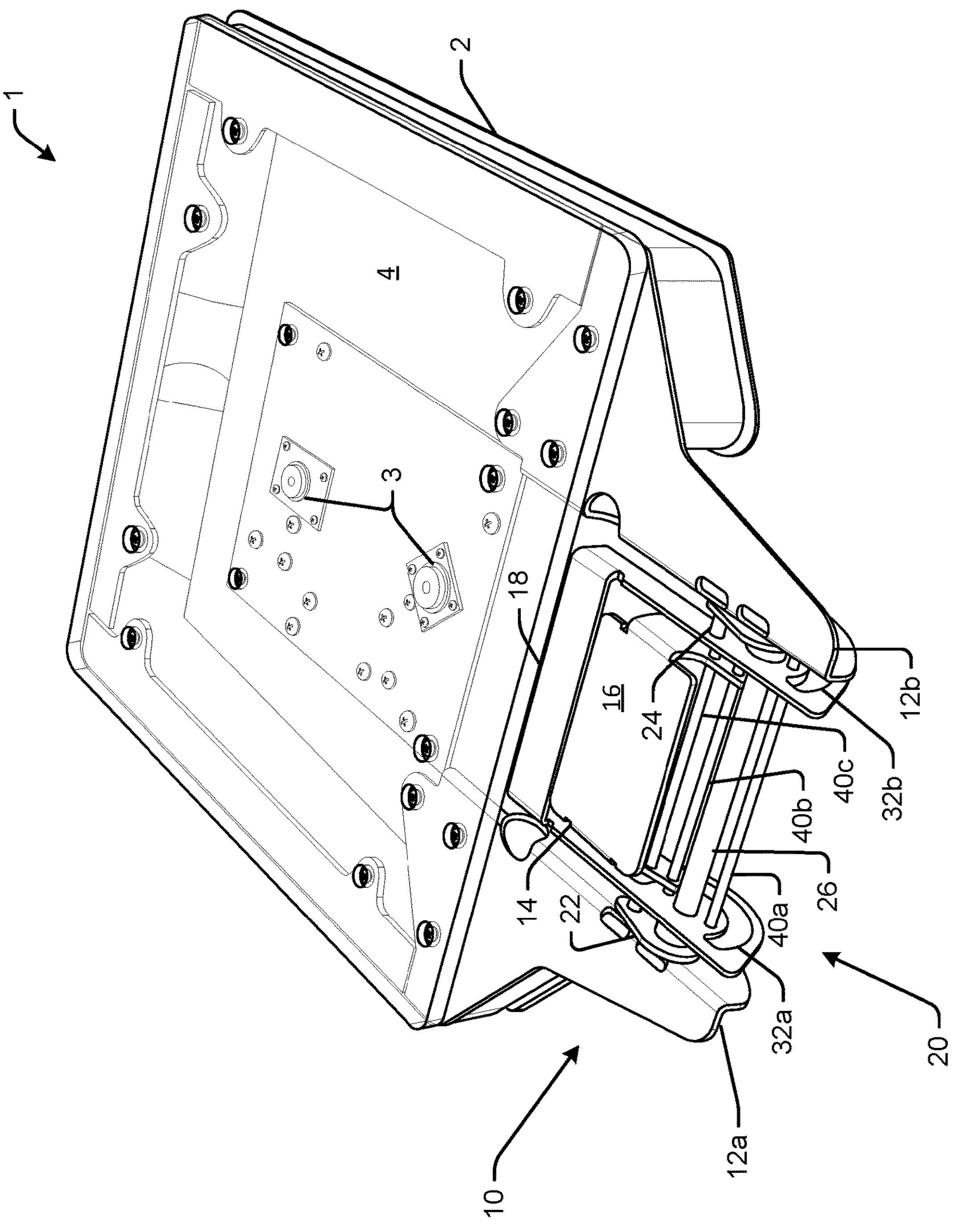
FIG. 1 shows an example secondary moving tag platen device on a printing platen.

An example secondary moving tag platen device for a printing platen is disclosed as it may be implemented in a printing operation (e.g., for shirts and/or other articles). The example printing platen is configured with a separate or secondary moving tag platen device for printing on a "tag area" (e.g., the back inner neck portion) of a shirt or other article. The example secondary moving tag platen device is configured to rotate or otherwise move the printing surface of the tag platen. For example, following a print operation the printing surface of the tag platen may be rotated out the way so that wet ink does not smear on the rest of the shirt. In an example, the example secondary moving tag platen device may include a dual purpose lever with clamp so that there is less likelihood of smearing ink onto the shirt.

An example of the secondary moving tag platen device includes a tag platen rotatably mounted to a first axis member (e.g., a rotatable shaft), a handle rotatably mounted to a second axis member (e.g., a separate rotatable shaft), and an opening (e.g., a channel or partial channel) formed in the handle. The first axis member of the tag platen extends through the opening so that the handle travels along the opening when the handle is rotated about the second axis member between an open position and a closed position. An indexing mechanism on the first axis member rotates the tag platen in conjunction with rotation of the handle. The tag platen moves to a shirt loading/unloading position when the handle is moved to the open position, and the tag platen moves to a tag printing position when the handle is moved to the closed position.

An example secondary moving tag platen device includes a counter rotating mechanism. In an example, the counter rotating mechanism is an indexing mechanism as shown and described herein, although other indexing mechanisms may also be provided (e.g., tooth and gear, ratchet). Other, non-indexing mechanisms may also be implemented (e.g., wheel and pulley, arm or linkage, cable, belt, pin/slot). Two axis members make it easy to level the tag platen and provide a solid foundation for the printing operation in the tag area.

During an example operation, prior to a print operation when loading the shirt or other article onto the platen, the tag platen can be rotated up to "grab" the neck part of the shirt to be printed on. The tag area of the shirt or other article can be printed on (e.g., with a label). After the print operation on the label or tag area, the tag platen can be rotated back down to release the neck portion of the shirt. This helps keep the wet ink on the inner tag area from smearing (e.g., on the opposite side of the shirt).

Before continuing, it is noted that as used herein, the terms "includes" and "including" mean, but is not limited to, "includes" or "including" and "includes at least" or "including at least." The term "based on" means "based on" and "based at least in part on."

It is also noted that the examples described herein are provided for purposes of illustration, and are not intended to be limiting. Other devices and/or device configurations may be utilized to carry out the operations described herein.

FIG. 1 shows an example secondary moving tag platen device 10 on a printing platen 1. The printing platen 1 may include a base structure 2 with positioning or alignment studs/detents 3 for properly placing the shirt printing surface 4 of printing platen 1 on a printing device (e.g., for screen printing, direct-to-garment, and other decorating processes) such as for printing on shirts, clothing, and/or other articles. The secondary moving tag platen device 10 may include shoulder members 12*a*, 12*b* for mounting to the printing platen 1.

In an example, the secondary moving tag platen device 10 includes a tag platen 14 with tag printing surface 16 in an outer portion of the shirt printing platen 1 between the shoulder members 12*a*, 12*b*. The secondary moving tag platen device 10 may also include a handle assembly (or simply "handle") 18. The handle 18 is configured as an actuating lever that drives rotation of the tag platen 14. The handle 18 may further operate as an excess material clamp for keeping the tag area of the shirt flat and out of the way of the screen printing, direct-to-garment, and other decorating processes on the body of the shirt during a printing operation.

It is noted that the term "handle" is not limited to manual operation, as the handle 18 or other structure may also be implemented as a lever arm or other actuating mechanism to manually, automatically, or semi-automatically effect the operations described herein.

Figure 9:
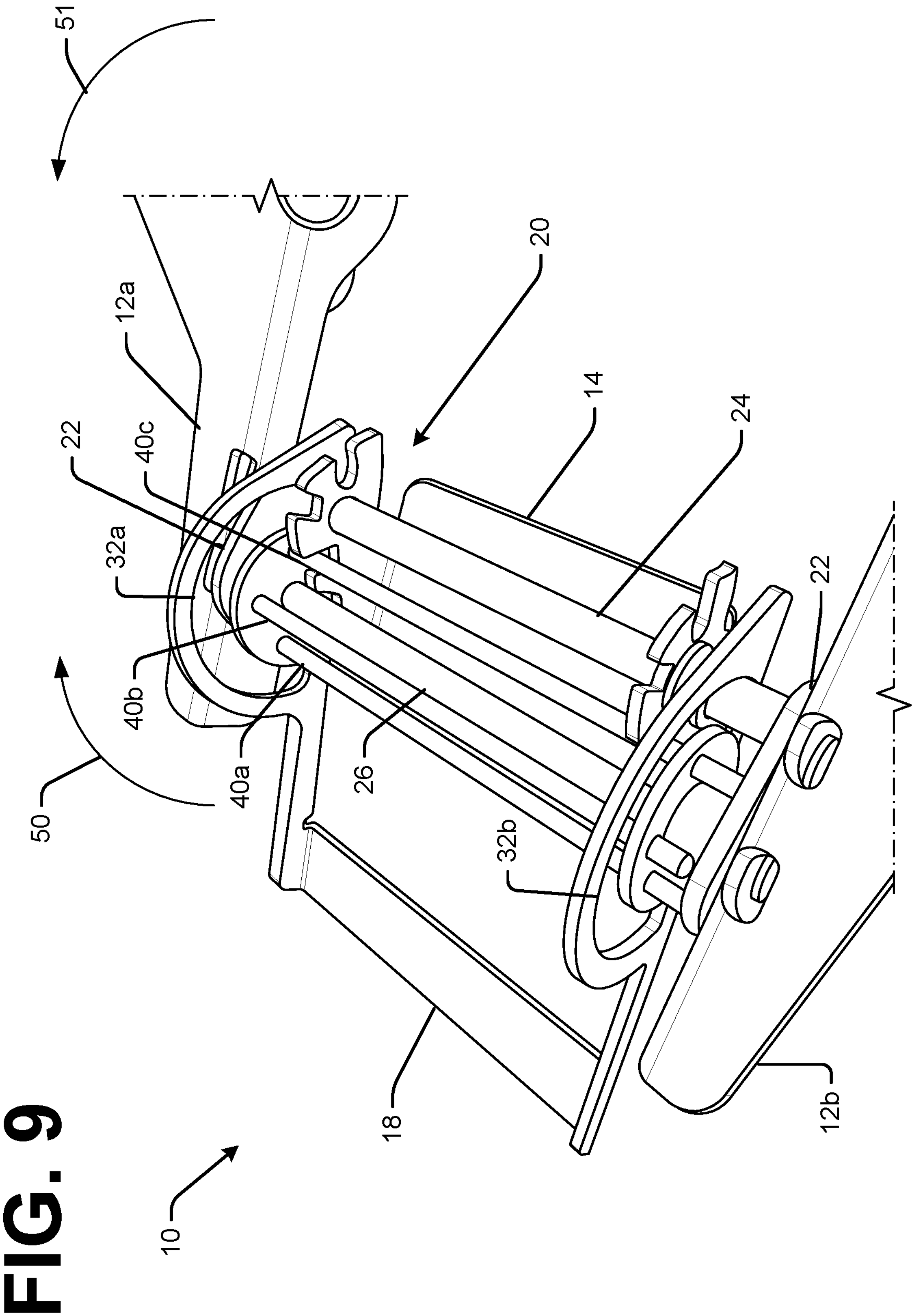
FIG. 9 is a top perspective view of an example secondary moving tag platen device, in an open position.
Figure 10:
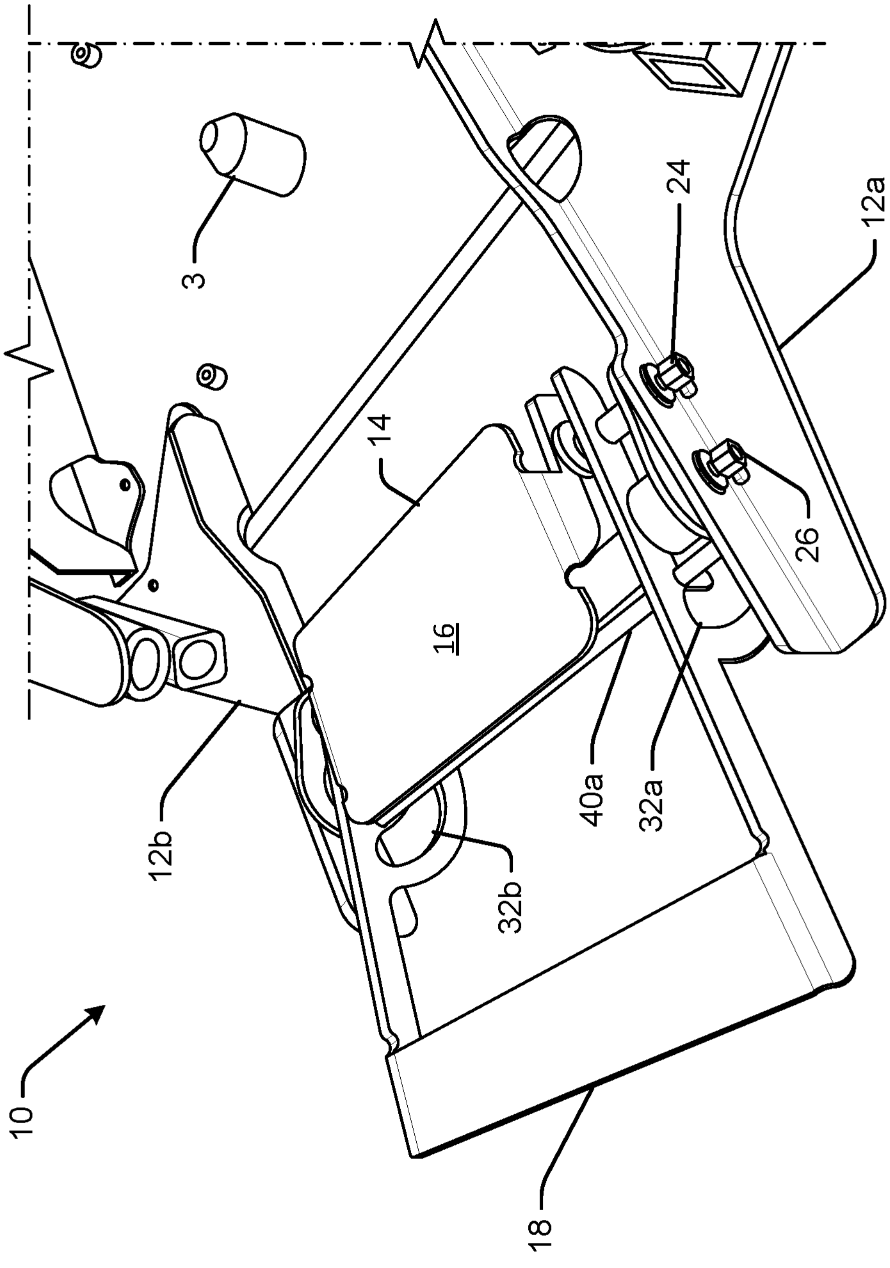
FIG. 10 is a bottom perspective view of the example secondary moving tag platen device corresponding to FIG. 9, in an open position.

In an example, the handle 18 is operatively linked to the tag platen 14 by a linking mechanism 20. During operation, the linking mechanism moves the tag platen 14 in conjunction with movement of the handle 18. The linking mechanism 20 may be operated to move the handle 18 and the tag platen 14 between and an open position (shown in FIGS. 1, 15 and 16) for loading a shirt onto the printing platen 1, and a closed position (as shown in FIGS. 9 and 10) that holds the neck part of a shirt in the tag printing area 16 for a printing operation. The linking mechanism 20 may again be operated to move the handle 18 and the tag platen 14 back to the open position (FIGS. 1, 15 and 16) to release the neck portion of the shirt and for loading another shirt onto the printing platen 1.

It is noted that the linking mechanism is shown and described herein with reference to an opening provided on the handle 18, and an indexing mechanism provided on the tag platen 14. However, these may be reversed. For example, the opening may be provided on the tag platen 14 and the indexing mechanism may be provided on the handle 18. This operation is described in more detail below with reference to FIGS. 9-16.

Figure 2:
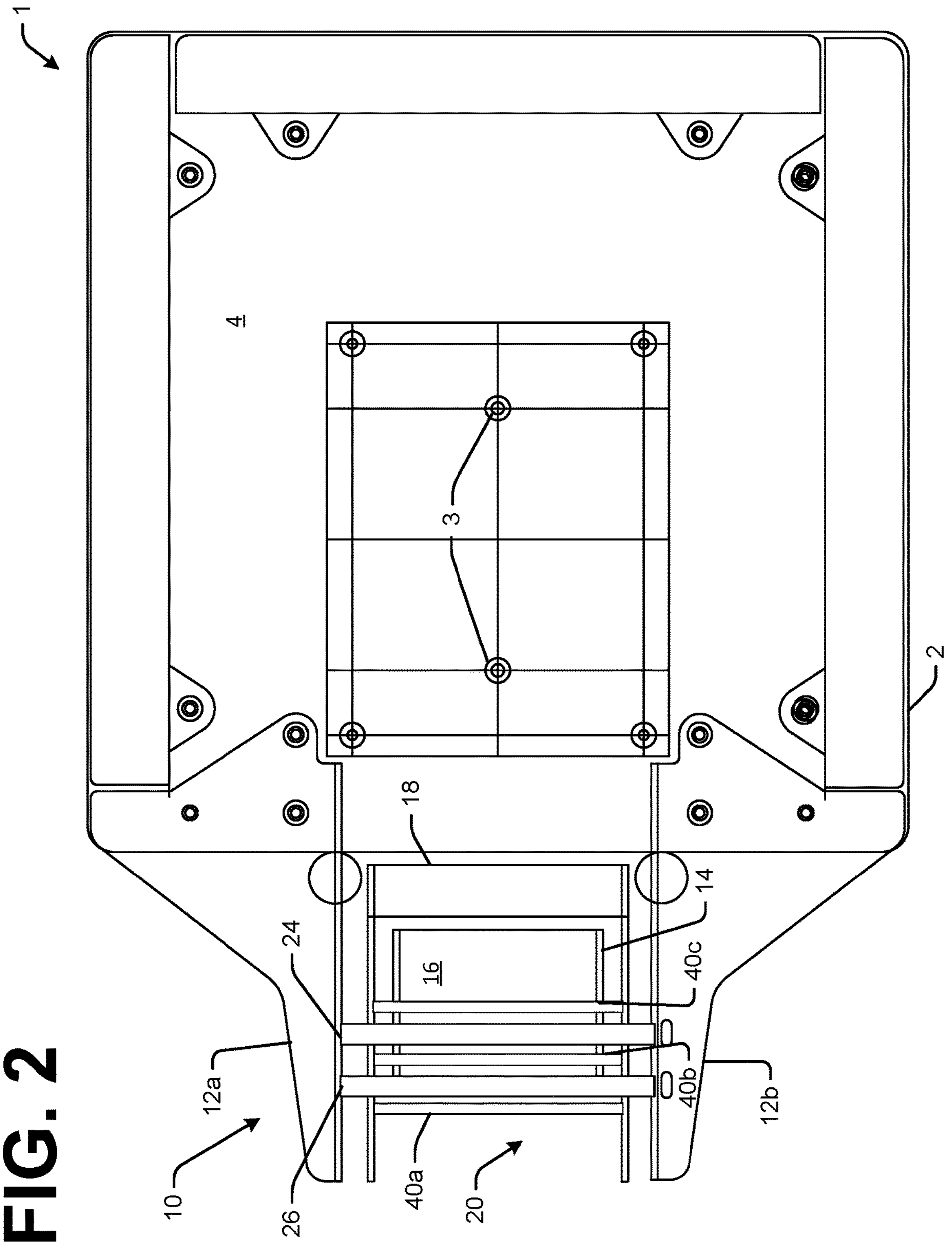
FIG. 2 is a top view of an example secondary moving tag platen device.
Figure 3:
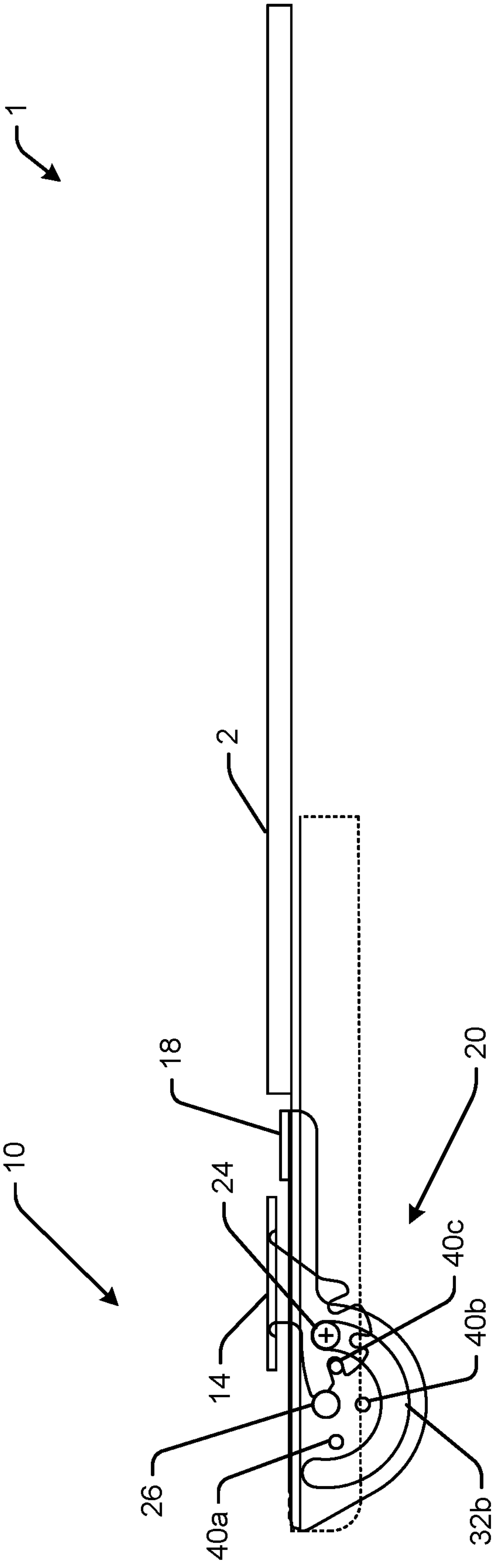
FIG. 3 is a side view of the example secondary moving tag platen device corresponding to FIG. 2.
Figure 4:
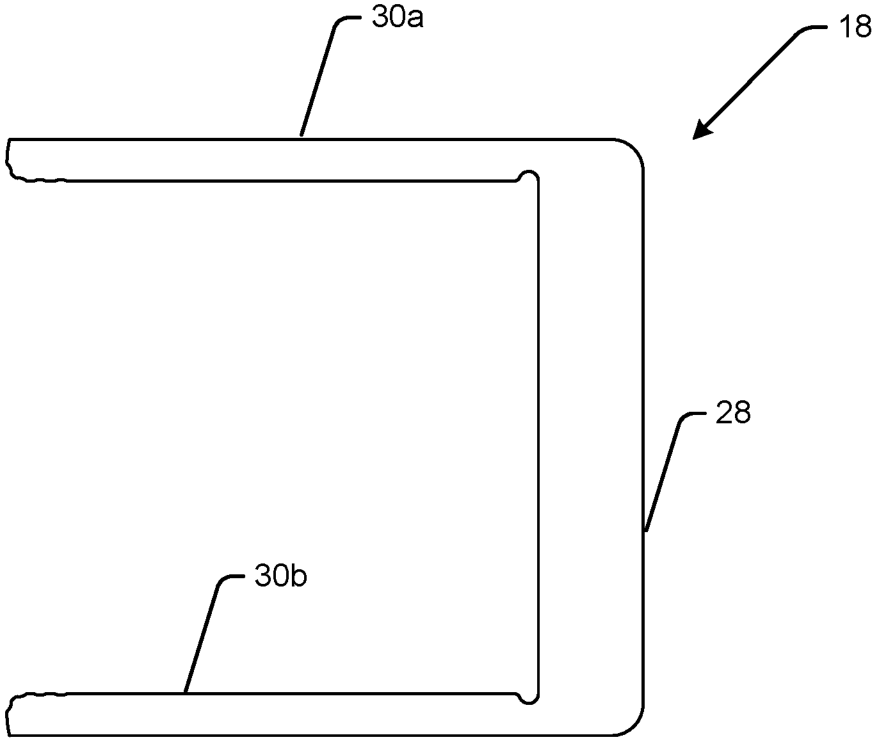
FIG. 4 is a top view of a handle of the example secondary moving tag platen device corresponding to FIG. 2.
Figure 5:
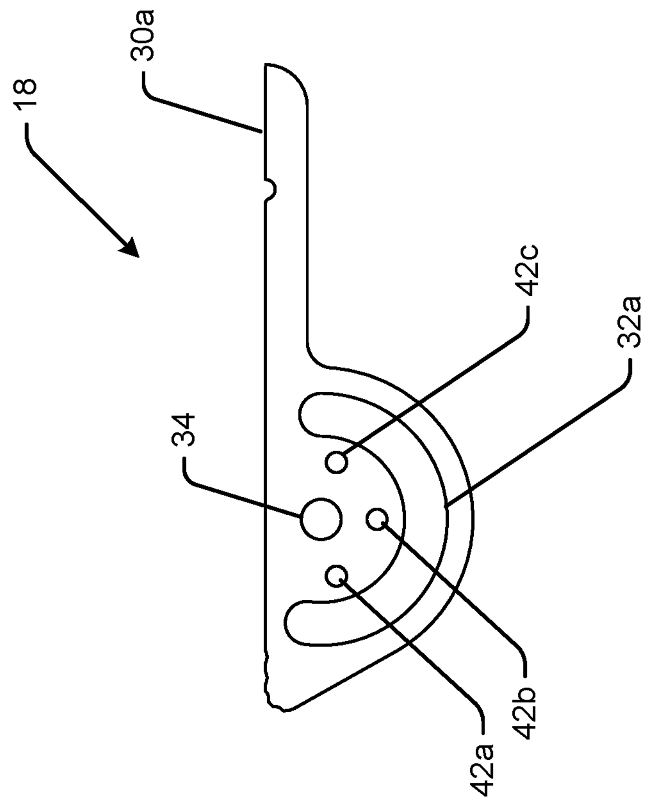
FIG. 5 is a side view of the handle corresponding to FIG. 4.
Figure 6:
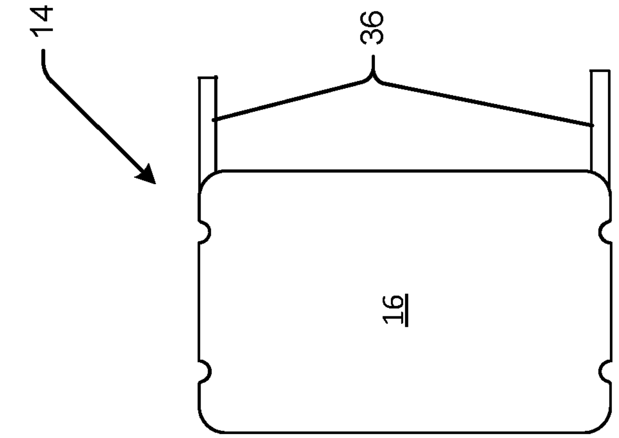
FIG. 6 is a top view of a tag platen of the example secondary moving tag platen device corresponding to FIG. 2.
Figure 7:
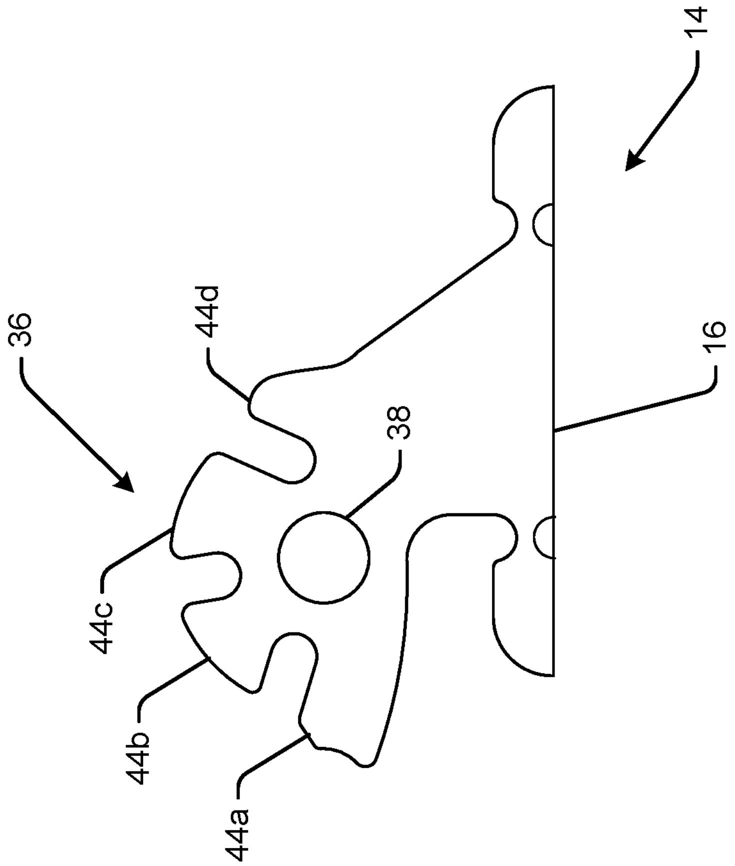
FIG. 7 is a side view of the tag platen corresponding to FIG. 6.

FIGS. 2-8 are engineering drawings of example components of the secondary moving tag platen device 10. FIG. 2 is a top view of an example secondary moving tag platen device 10. FIG. 3 is a side view of the example secondary moving tag platen device 10 corresponding to FIG. 2. FIG. 4 is a top view of a handle 18 of the example secondary moving tag platen device 10 corresponding to FIG. 2. FIG. 5 is a side view of the handle 18 corresponding to FIG. 4. FIG. 6 is a top view of a tag platen 14 of the example secondary moving tag platen device 10 corresponding to FIG. 2. FIG. 7 is a side view of the tag platen 14 corresponding to FIG. 6.

In an example, the secondary moving tag platen device 10 for a shirt printing platen 1 includes a tag platen 14. The tag platen 14 is mounted on a shaft or first axis member 24. The first axis member 24 is mounted at a first fixed position on the shirt printing platen 1. The tag platen 14 rotates about this longitudinal axis.

The secondary moving tag platen device 10 also includes a handle mechanism 18. The handle 18 has a cross member 28 and at least one leg (legs 30*a*, 30*b* are shown in the drawings). In an example, the legs 30*a*, 30*b* of the handle 18 form a generally U-shape. It is noted, however, that the handle 18 is not limited to this configuration. The handle 18 is mounted to a shaft or second axis member 26 (adjacent to, but separate from the first axis member 24). The second axis member 26 is mounted at a second fixed position on the shirt printing platen 1. The handle 18 rotates about this longitudinal axis.

The movement or rotation of the tag platen 14 and handle 18 is described in more detail below with reference to FIGS. 9-16.

As seen in FIG. 5, the handle 18 may also include one or more opening (e.g., channel 32*a*, 32*b*, partial channel, or other opening). For example, a first arcuate shaped channel 32*a* is shown as it may be formed in the first leg 30*a* of the handle 18, and a second arcuate shaped channel 32*b* is shown as it may be formed in the second leg 30*b* of the handle 18.

The first axis member 24 of the tag platen 14 extends through and sides along the arcuate shaped channels 32*a*, 32*b*. The handle 18 can be rotated between an open position and a closed position by rotating about the second axis member 26 (mounted at openings 34 formed in each leg 30*a*, 30*b*). During operation, the handle 18 is rotated about the second axis member 26 so that the first axis member 24 of the tag platen 14 travels at least partly along the length of the arcuate shaped channels 32*a*, 32*b*.

Figure 21:
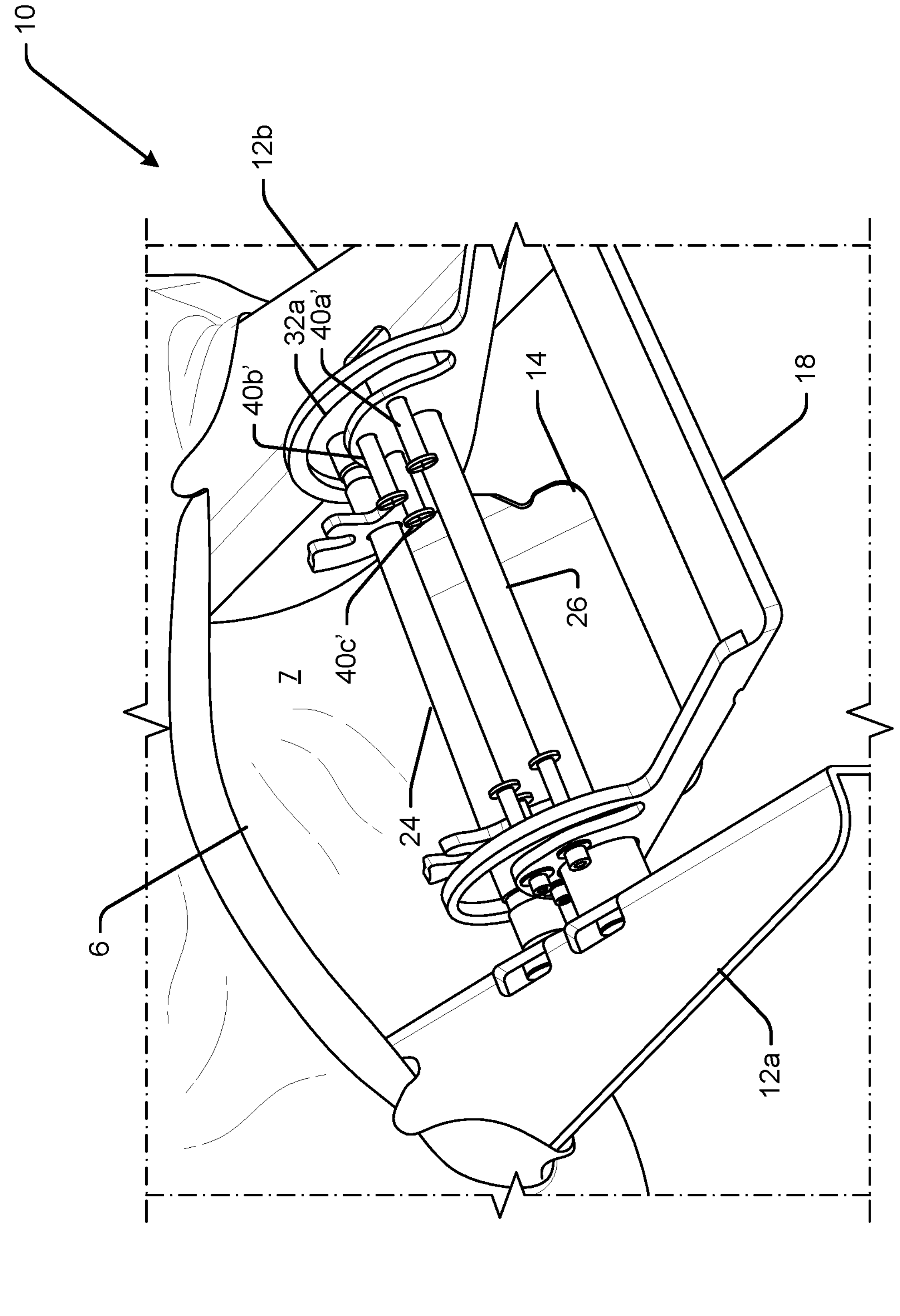
Figure 22:
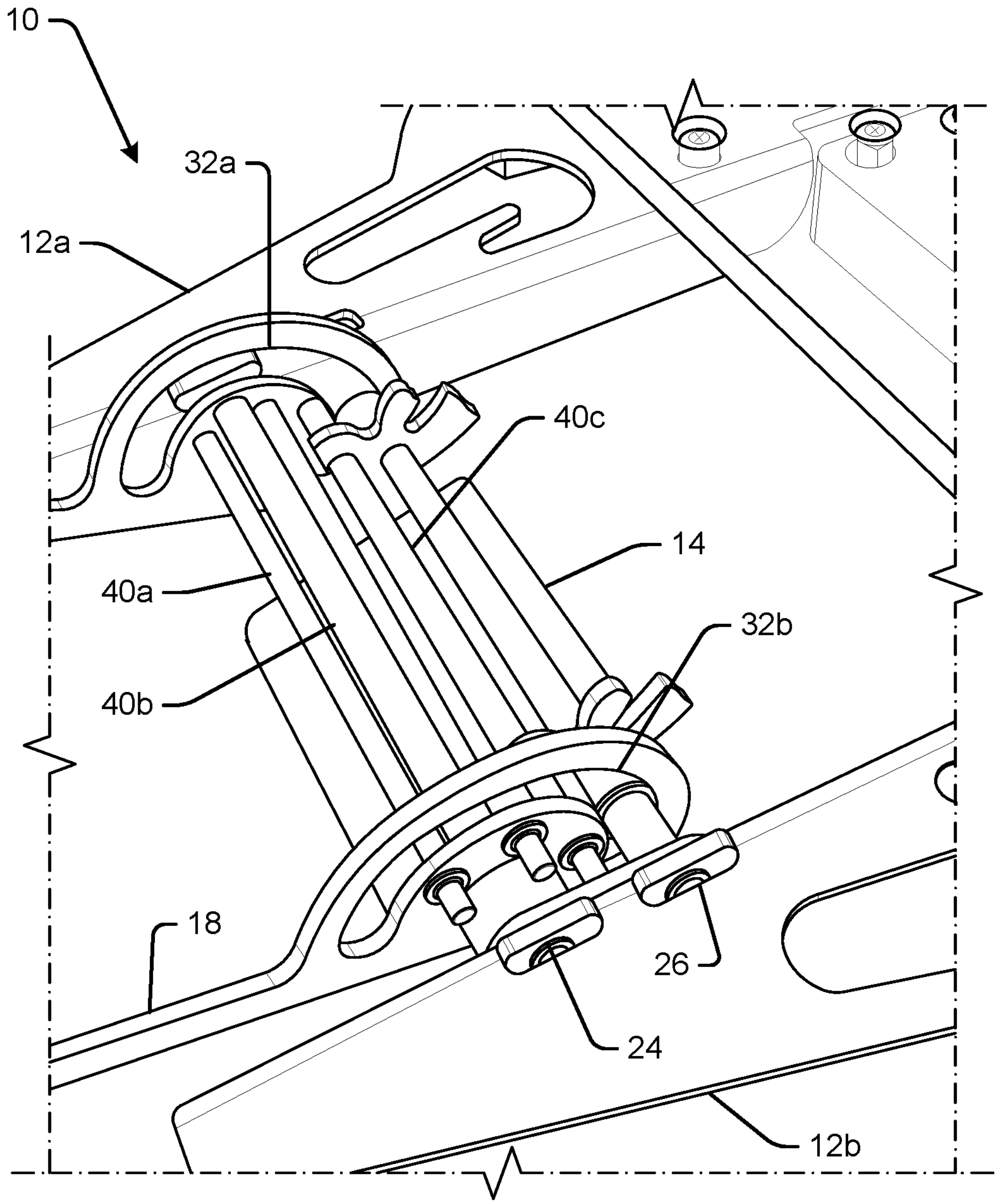
Figure 23:
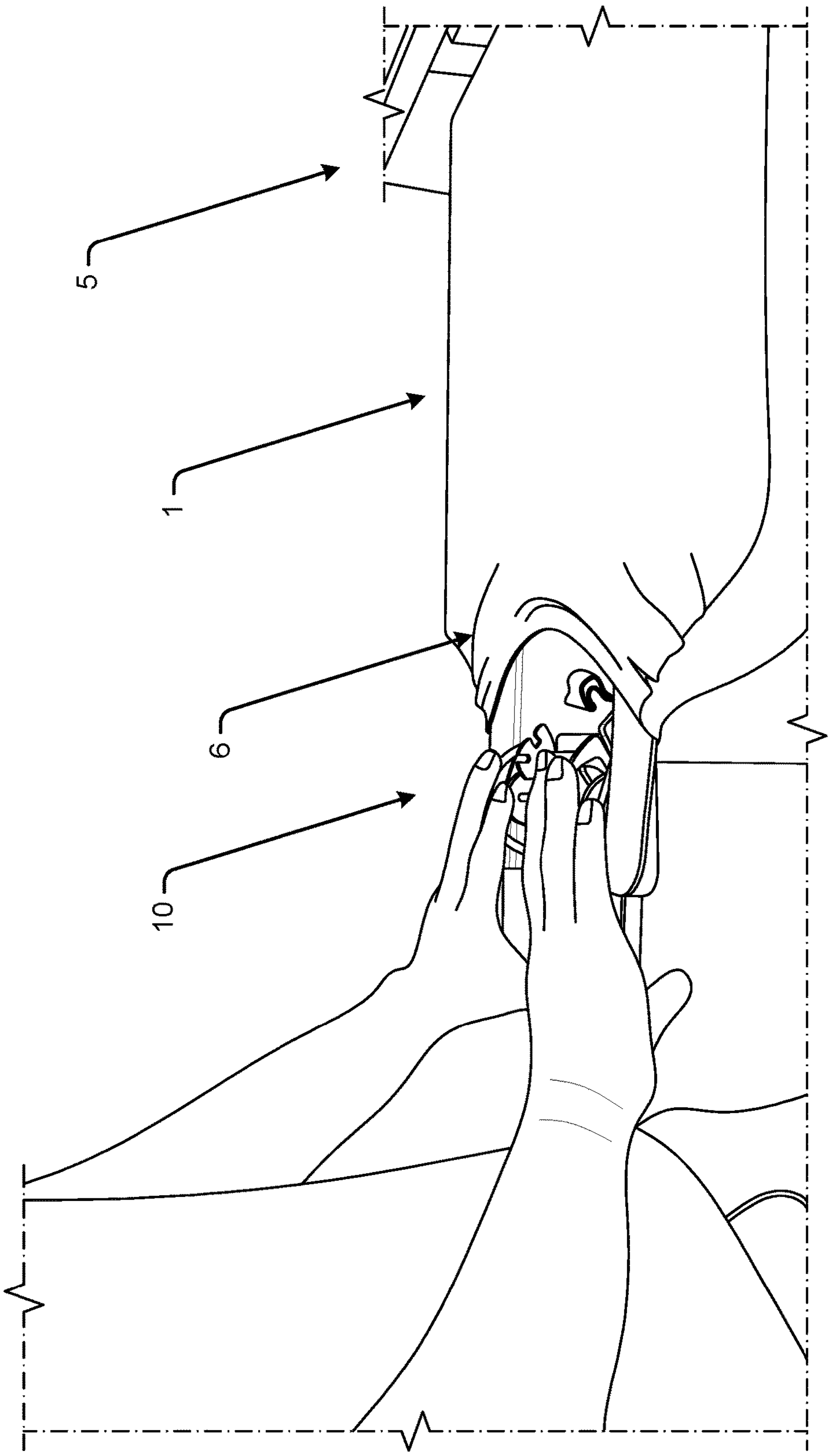
Figure 24:
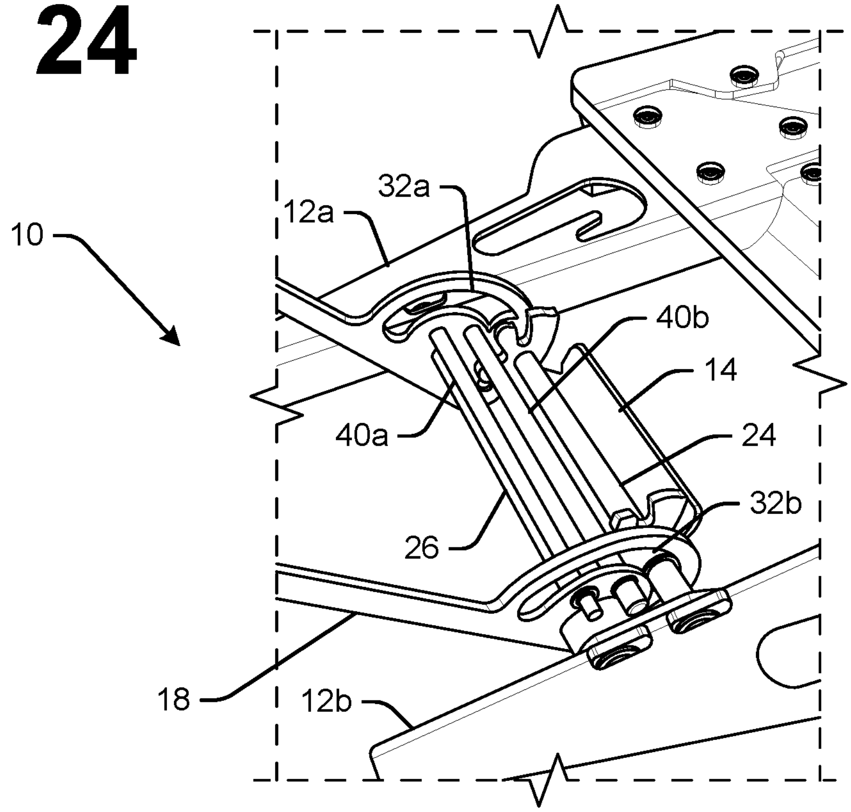
Figure 24:
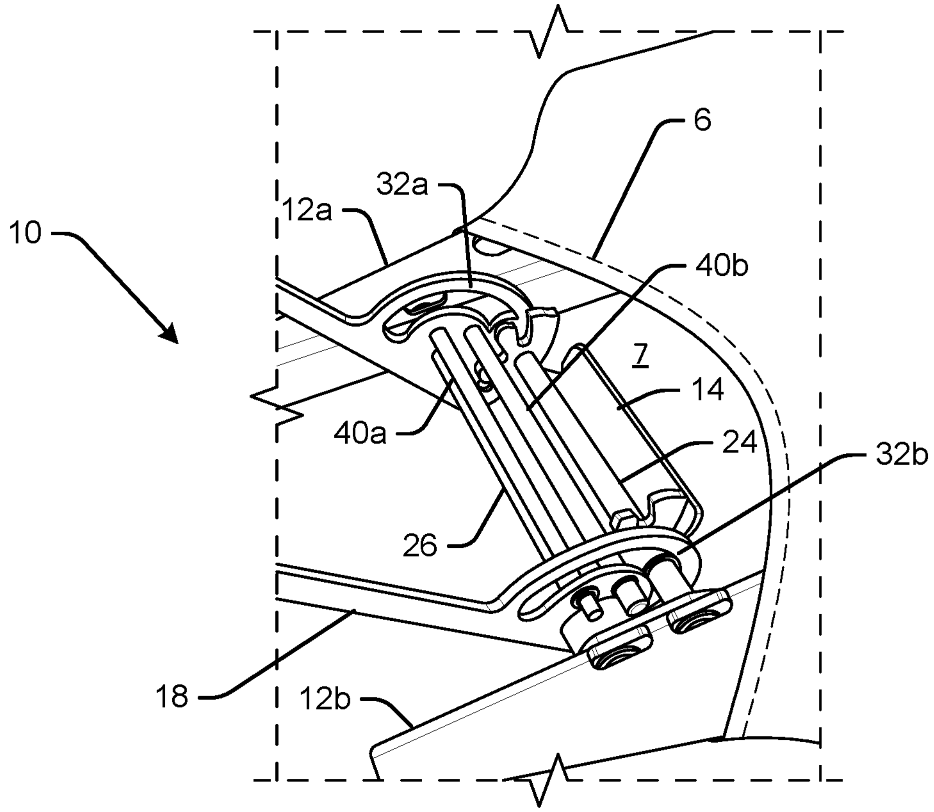
Figure 25:
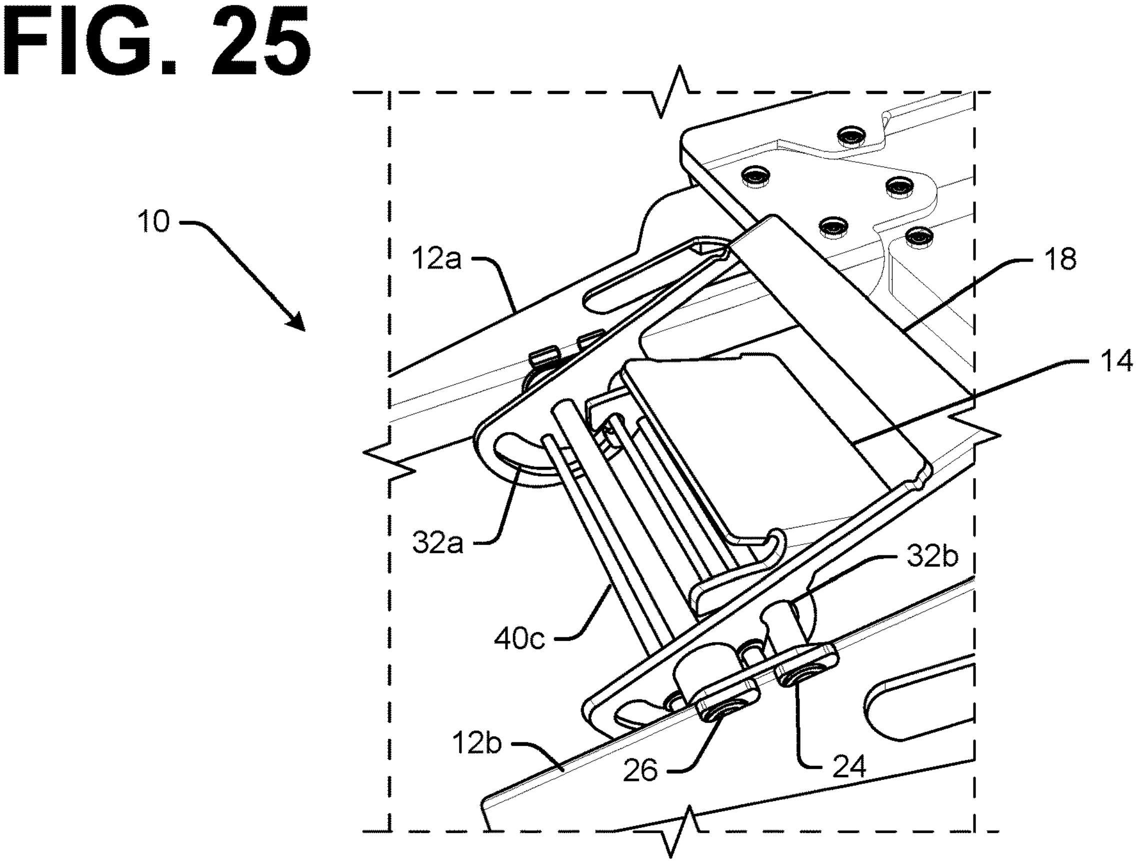
Figure 25:
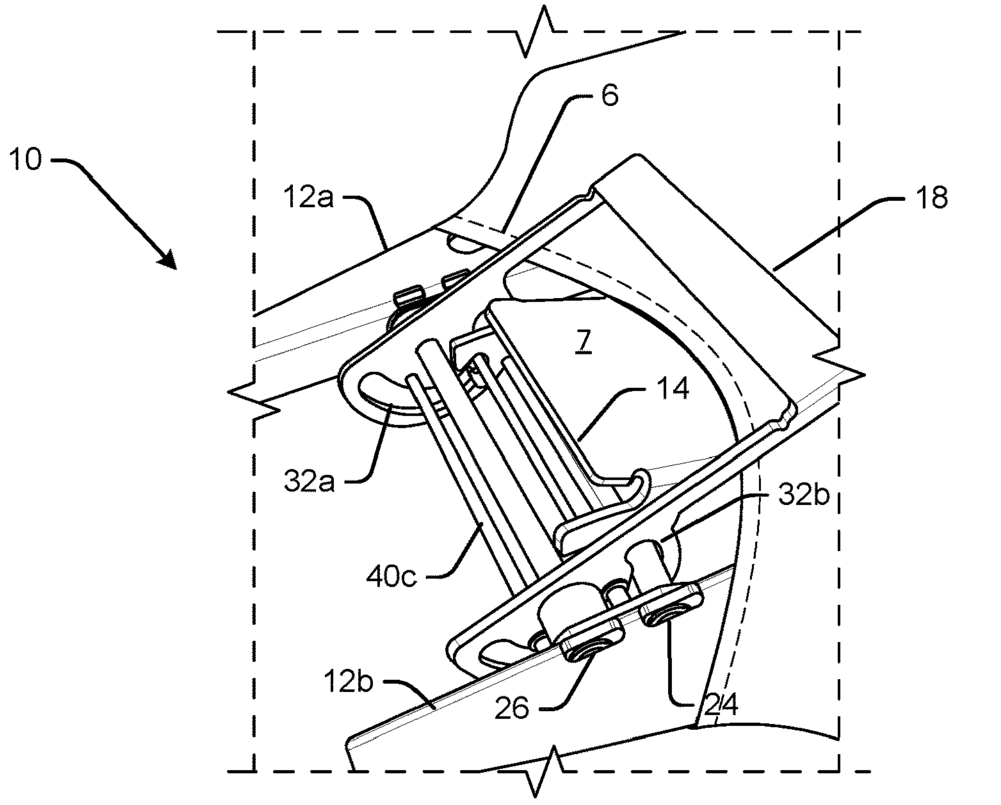
Figure 26:
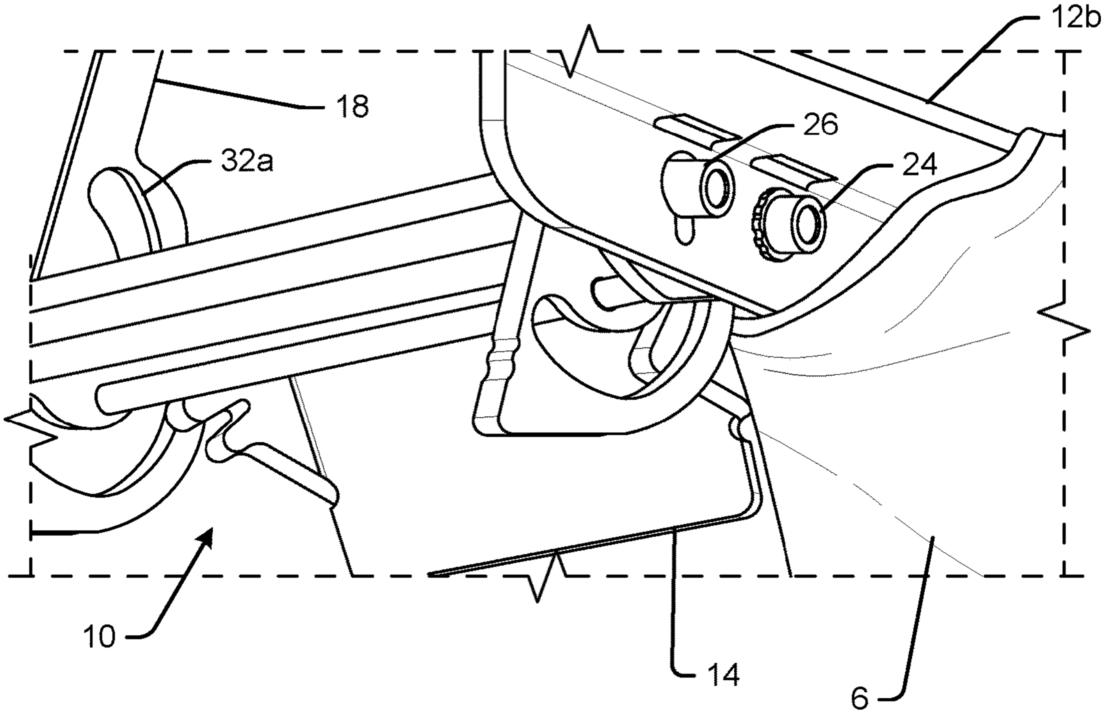
Figure 26:
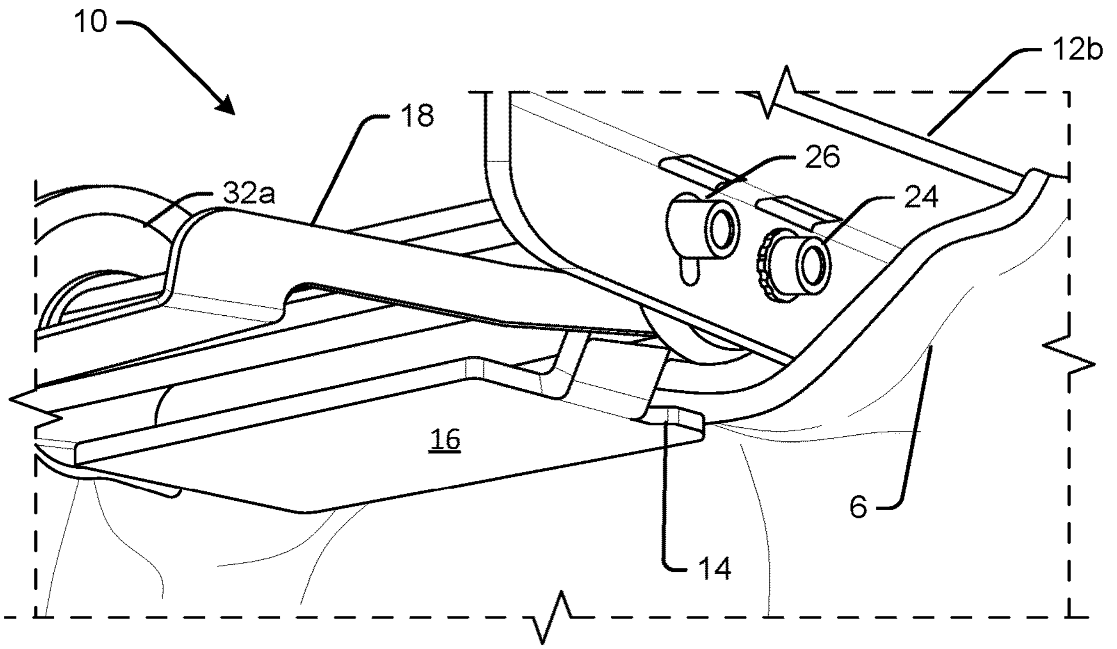
Figure 27:
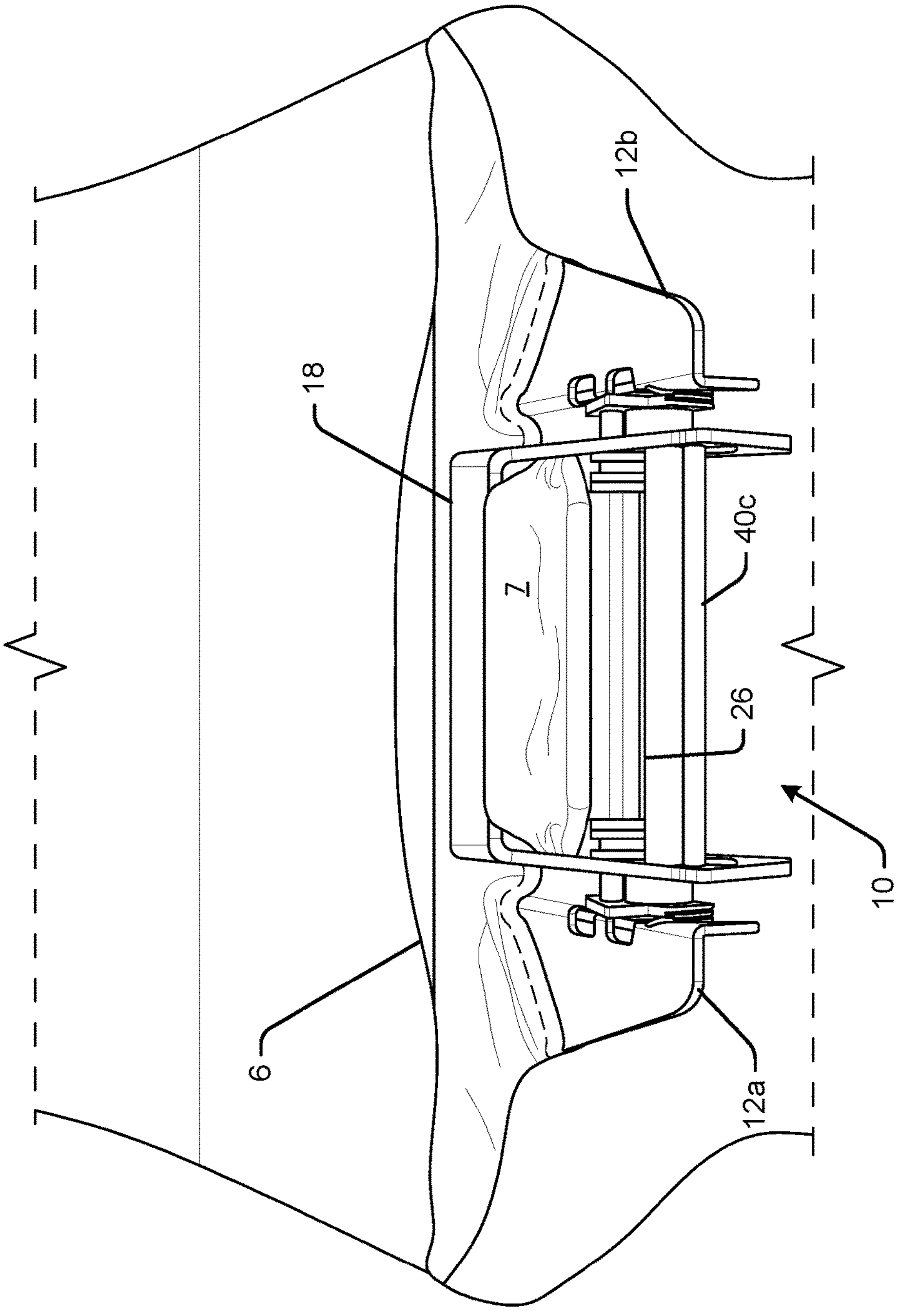
Figure 28:
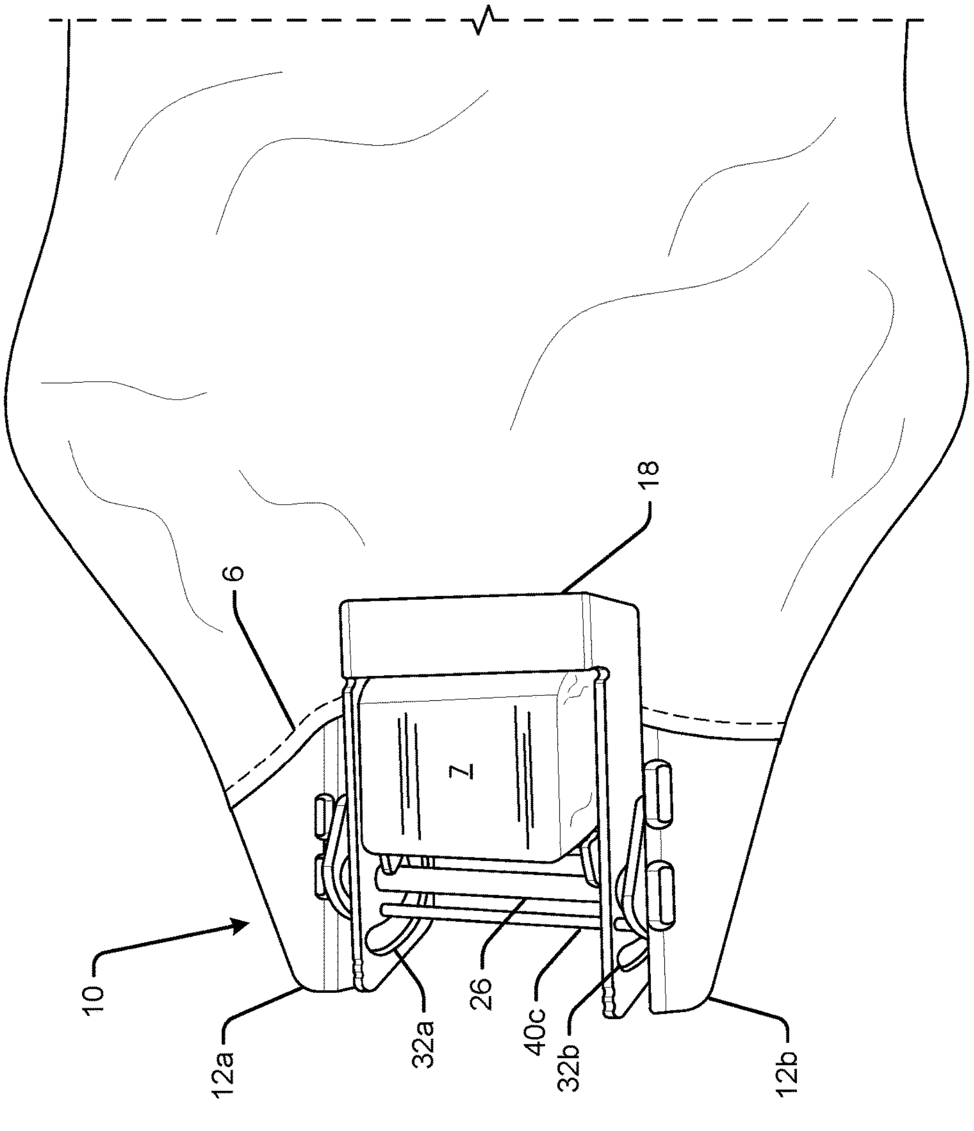
Figure 29:
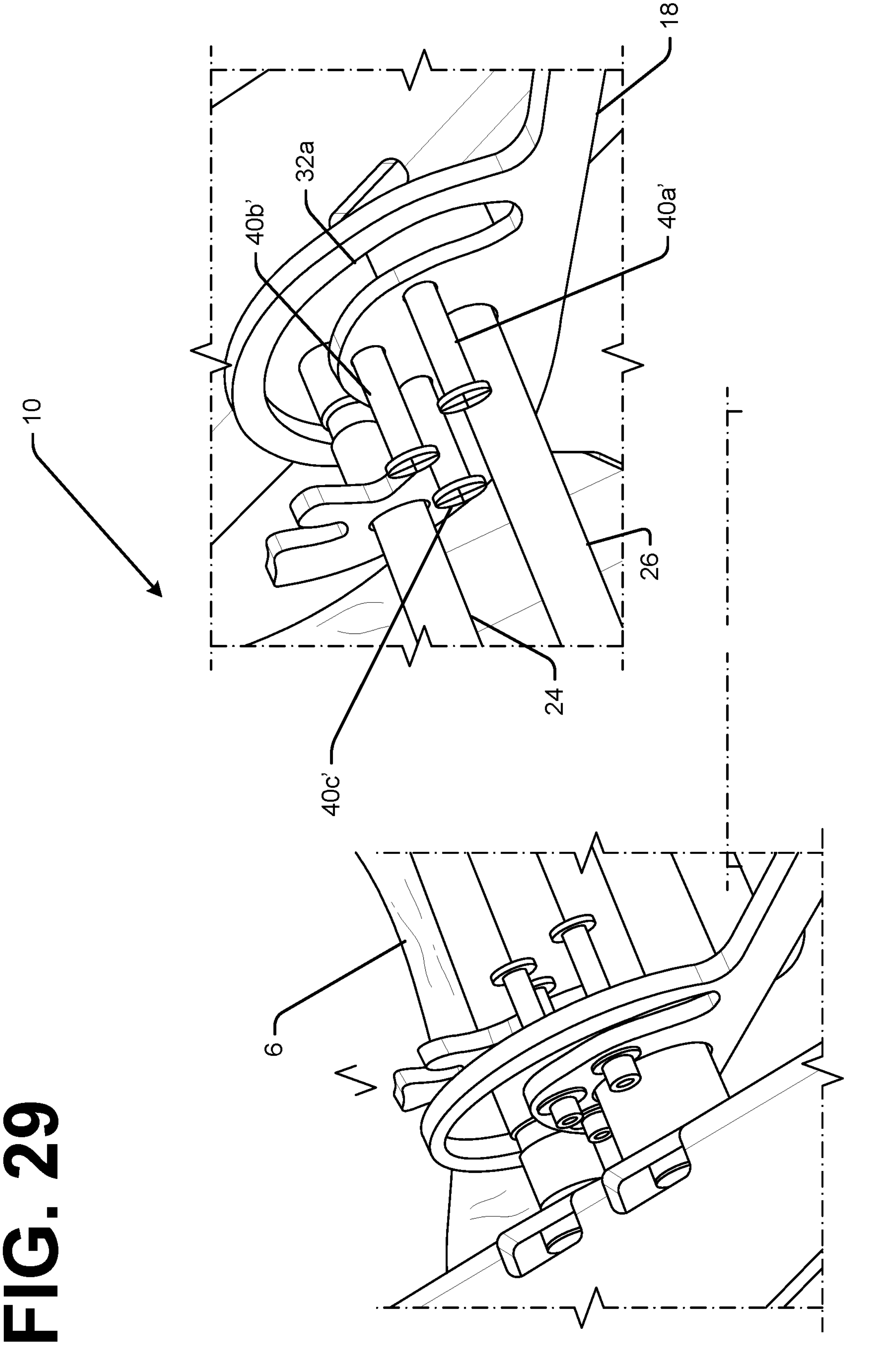

In an example, the secondary moving tag platen device 10 also includes an indexing mechanism 36 to operate in conjunction with the first axis member 24 of the tag platen 14 and rotate the tag platen 14 in response to rotation of the handle 18. In an example, the first axis member 24 is mounted through the openings 38 formed on each side of the tag platen 14. The indexing mechanism 36 includes one or more shaft(s) 40*a-c* (see, e.g., 40*a*'-c' in FIG. 21) mounted through openings 42*a-c* between the first leg 30*a* and the second leg 30*b* of the handle 18. The indexing mechanism also includes one or more teeth 44*a-d* and/or openings formed between the teeth 44*a-d* on the tag platen 14. The teeth 44*a-d* and/or openings formed between the teeth 44*a-d* on the tag platen 14 engage with the shaft(s) 40*a-c* of the handle 18 to move the tag platen 14 in response to rotation of the handle 18. In an example, the tag platen 14 moves in a direction opposite of the direction of movement of the handle 18, as described in more detail below with reference to FIGS. 9-16.

It is noted that the indexing mechanism 36 is illustrative of an example indexing mechanism. Other indexing mechanisms are also contemplated, for example, but not limited to, gears or ratchets.

Figure 8:
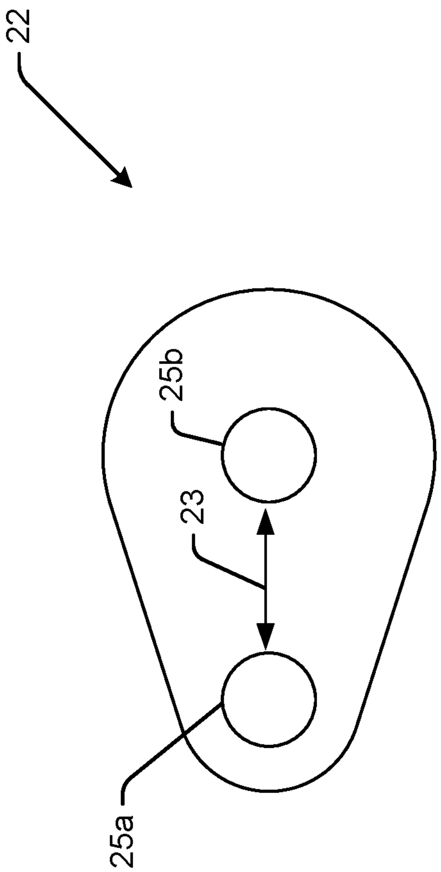
FIG. 8 is a side view of a spacer of the example secondary moving tag platen device.

FIG. 8 is a side view of a spacer 22 of the example secondary moving tag platen device 10. The mounting location of each spacer 22 is shown in FIG. 1 on each end of the secondary moving tag platen device 10. The spacer 22 ensures a fixed distance 23 between mounting locations 25*a*, 25*b* for shafts 24 and 26, respectively.

FIGS. 9-16 illustrate example operation of the secondary moving tag platen device 10 between an open position and a closed position. In an example, the linking mechanism moves the tag platen 14 in conjunction with movement of the handle 18. The linking mechanism 20 may be operated to move the handle 18 and the tag platen 14 between and an open position (shown in FIGS. 9-10) for loading a shirt onto the printing platen 1, and a closed position (as shown in FIG. 1, and also seen FIGS. 15-16) that holds the neck part of a shirt in the tag printing area 12 for a printing operation. The linking mechanism 20 may again be operated to move the handle 18 and the tag platen 14 back to the open position (FIGS. 9 and 10) to release the neck portion of the shirt and for loading another shirt onto the printing platen 1.

In an example, the mechanism to move the tag platen 14 in response to movement of the handle 18 is via counter-rotation. That is, the handle 18 rotates in a direction that is opposite the direction of the tag platen 14 (arrows 50 and 51 illustrated in FIG. 9). This rotation of the handle 18, and hence the tag platen 14 may be automatic (e.g., hydraulically, by air, via electric motor, etc.), at least partially automatic, and/or manually by a user.

FIG. 9 is a top perspective view of an example secondary moving tag platen device 10, in an open position. FIG. 10 is a bottom perspective view of the example secondary moving tag platen device 10 corresponding to FIG. 9, in an open position. The shirt (or other article) can be loaded/unloaded on the printing platen 1 when the secondary moving tag platen device 10 is in the open position.

Figure 11:
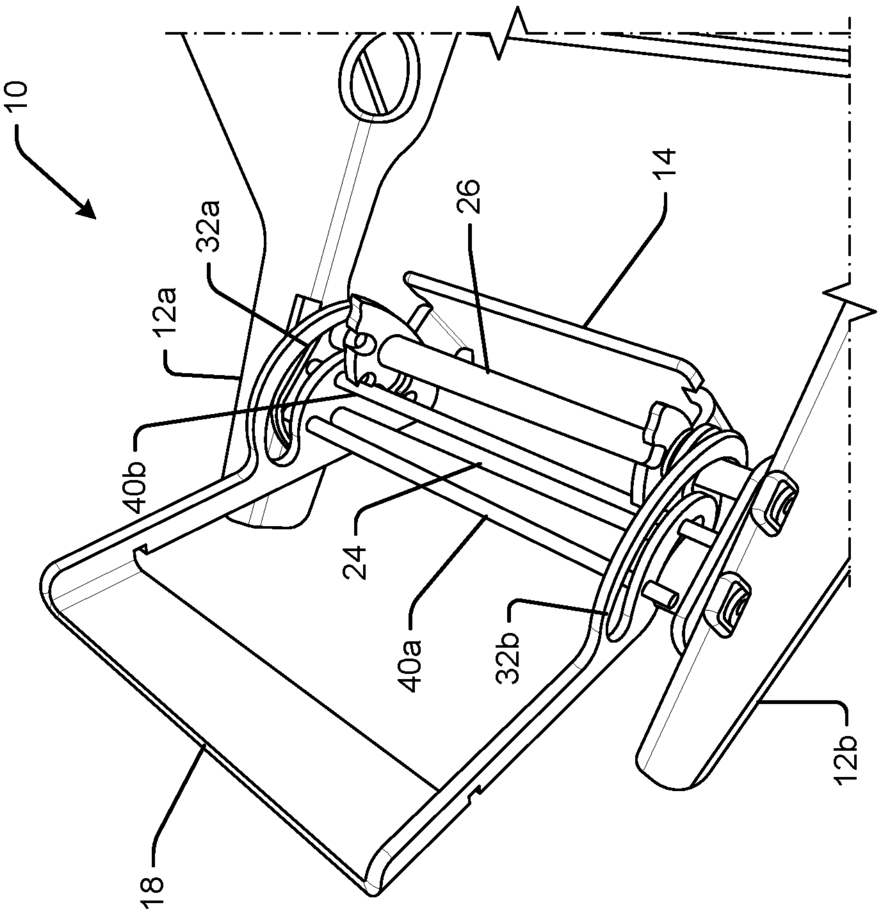
FIGS. 11 and 12 are top perspective views of the example secondary moving tag platen device corresponding to FIG. 9, with the handle moving toward a closed position.
Figure 12:
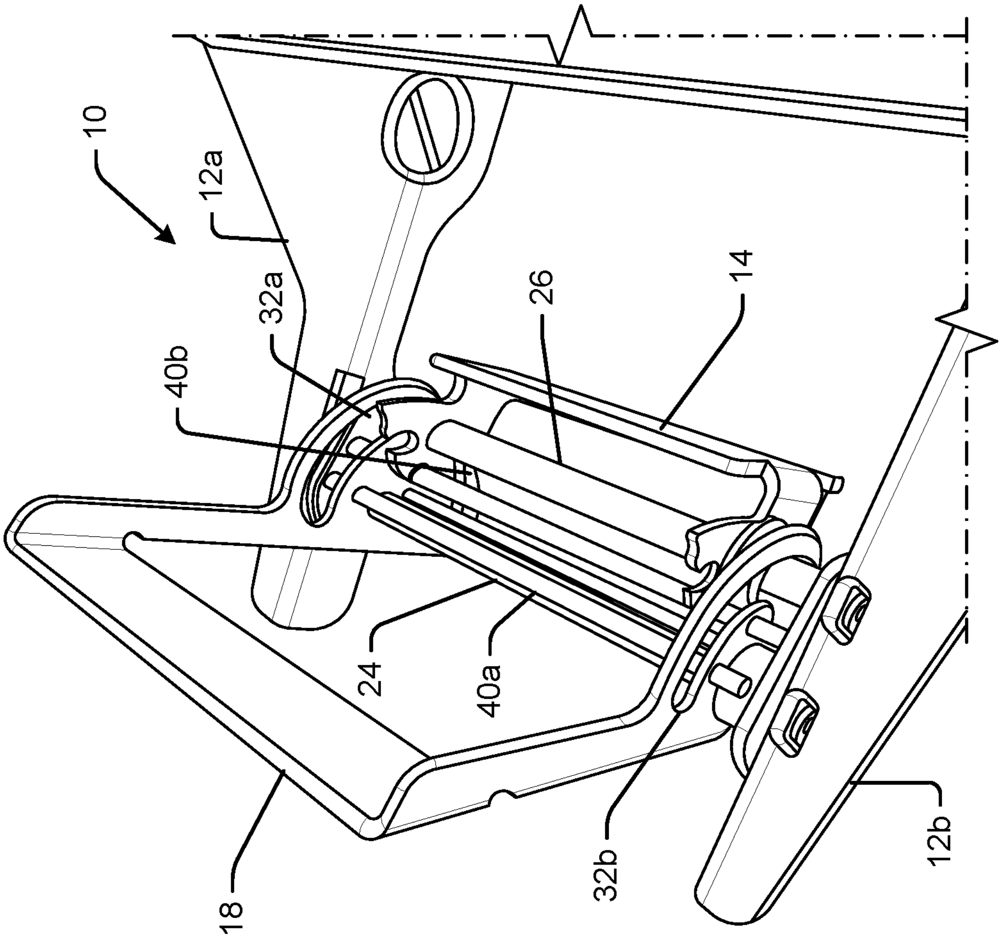
Figure 13:
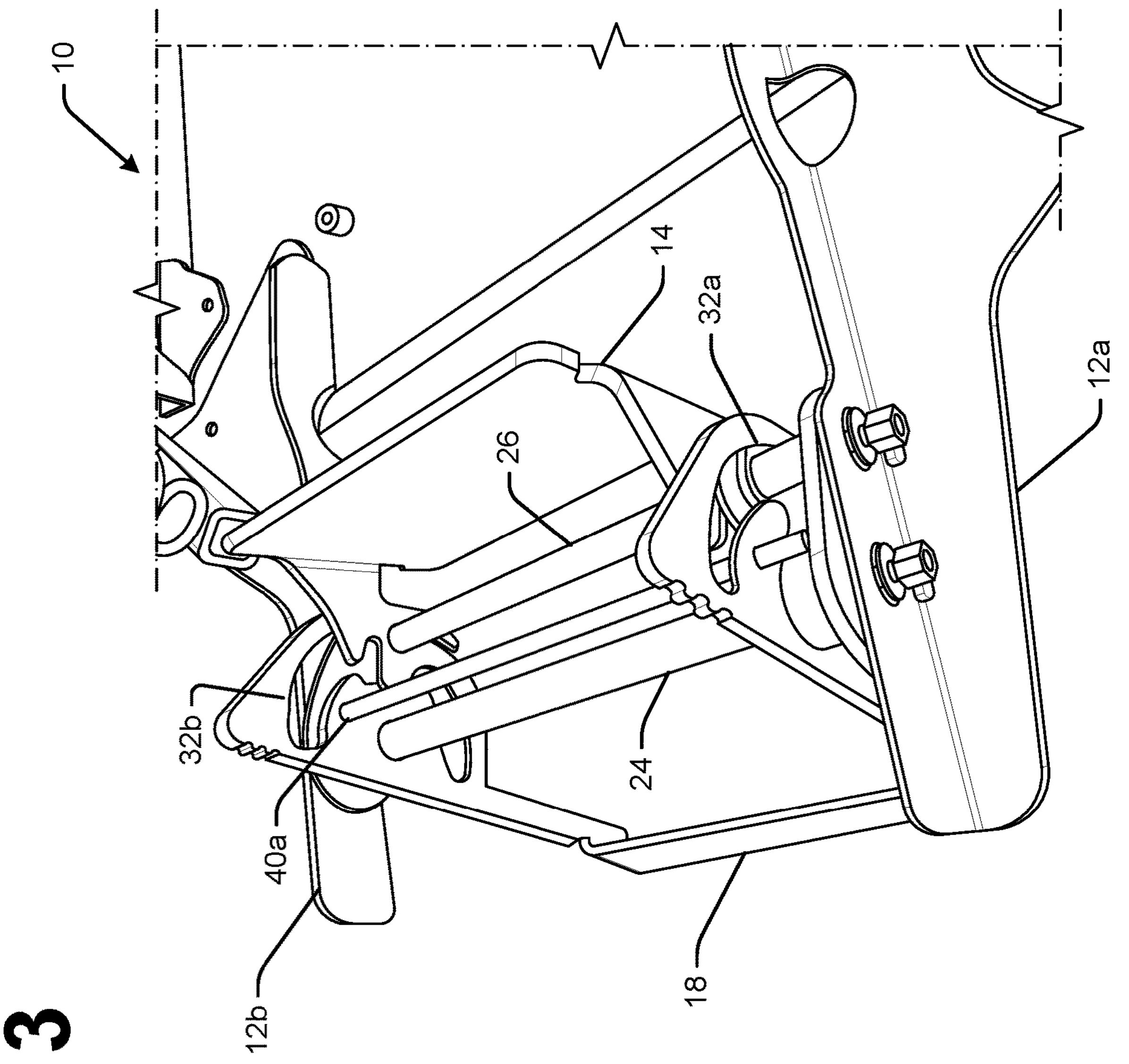
FIG. 13 is a bottom perspective view of the example secondary moving tag platen device corresponding to FIG. 12.
Figure 14:
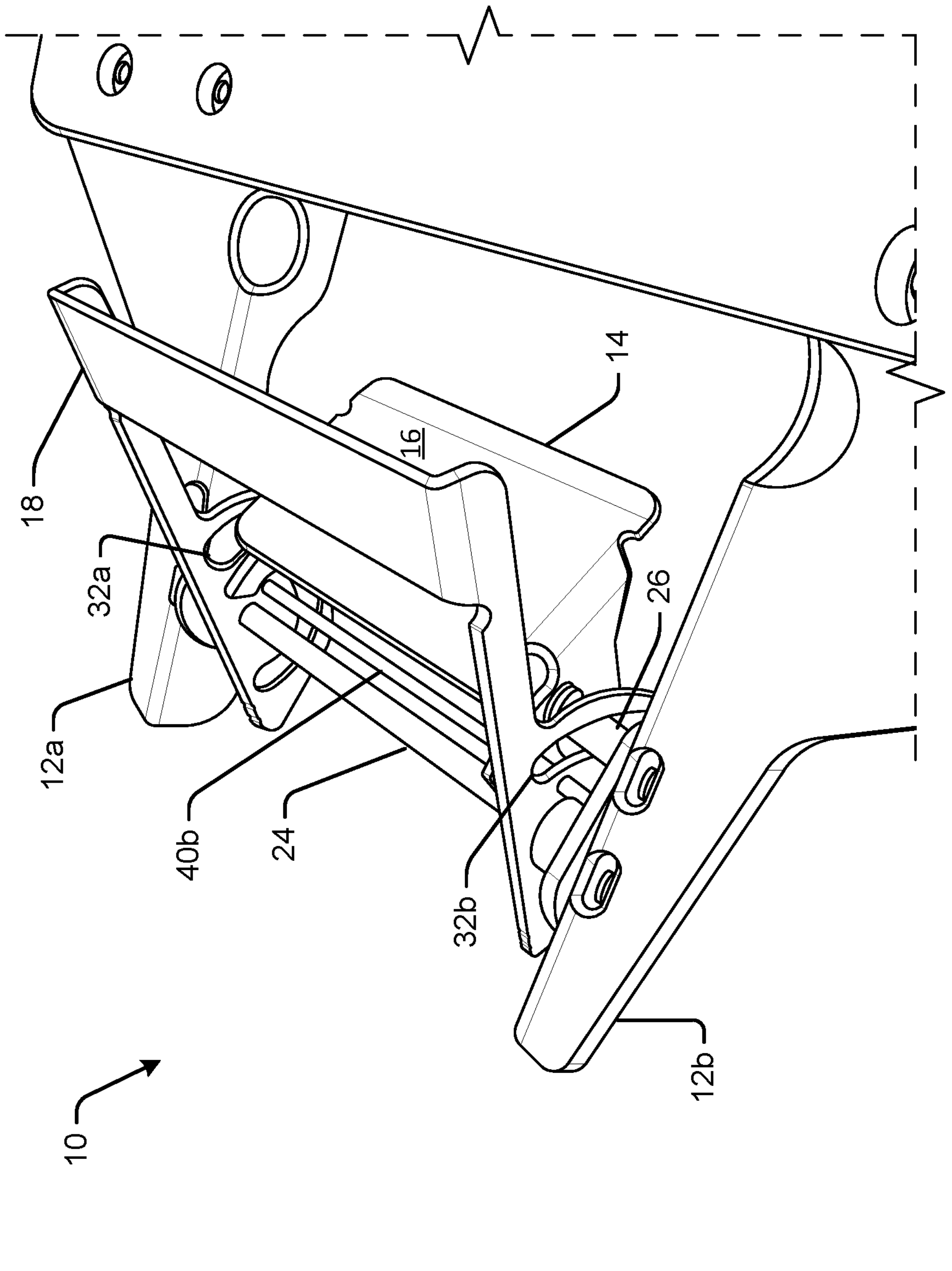
FIG. 14 is a top perspective view of the example secondary moving tag platen device corresponding to FIG. 9, with the handle moving toward a closed position.

FIGS. 11 and 12 are top perspective views of the example secondary moving tag platen device 10 corresponding to FIG. 9, with the handle moving toward a closed position. In FIG. 12, the handle 18 and tag printing surface 16 are rotated about 90 degrees from the open position. It is noted that this is also about 90 degrees from the closed position, as the handle 18 and tag printing surface 16 rotate about 180 degrees between the open position and the closed position. FIG. 13 is a bottom perspective view of the example secondary moving tag platen device 10 corresponding to FIG. 12, showing the handle 18 and tag printing surface 16 rotated about 90 degrees from the open position. FIG. 14 is a top perspective view of the example secondary moving tag platen device 10 corresponding to FIG. 9, with the handle moving past the central (or 90 degree) position toward a closed position.

Figure 15:
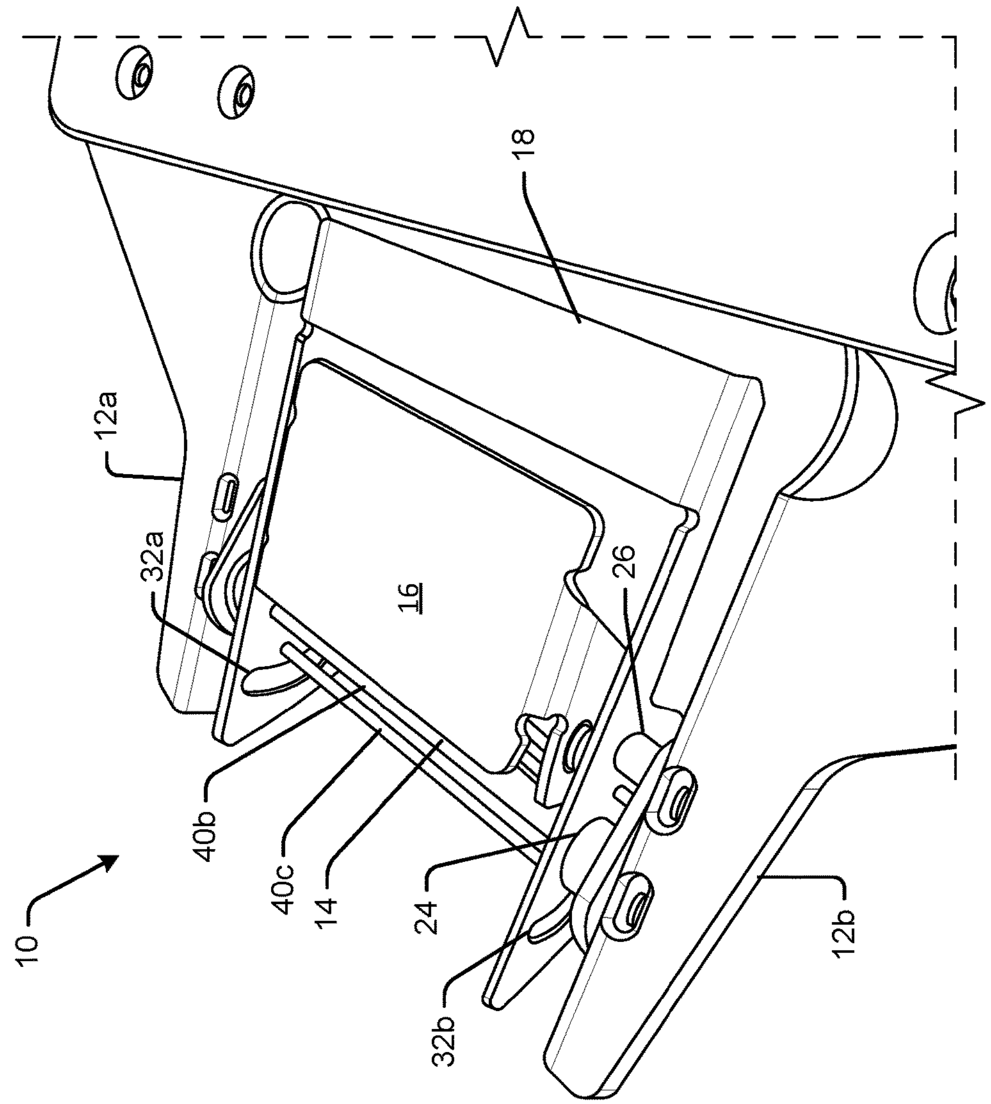
FIG. 15 is a top perspective view of the example secondary moving tag platen device corresponding to FIG. 9, with the handle fully in the closed position.
Figure 16:
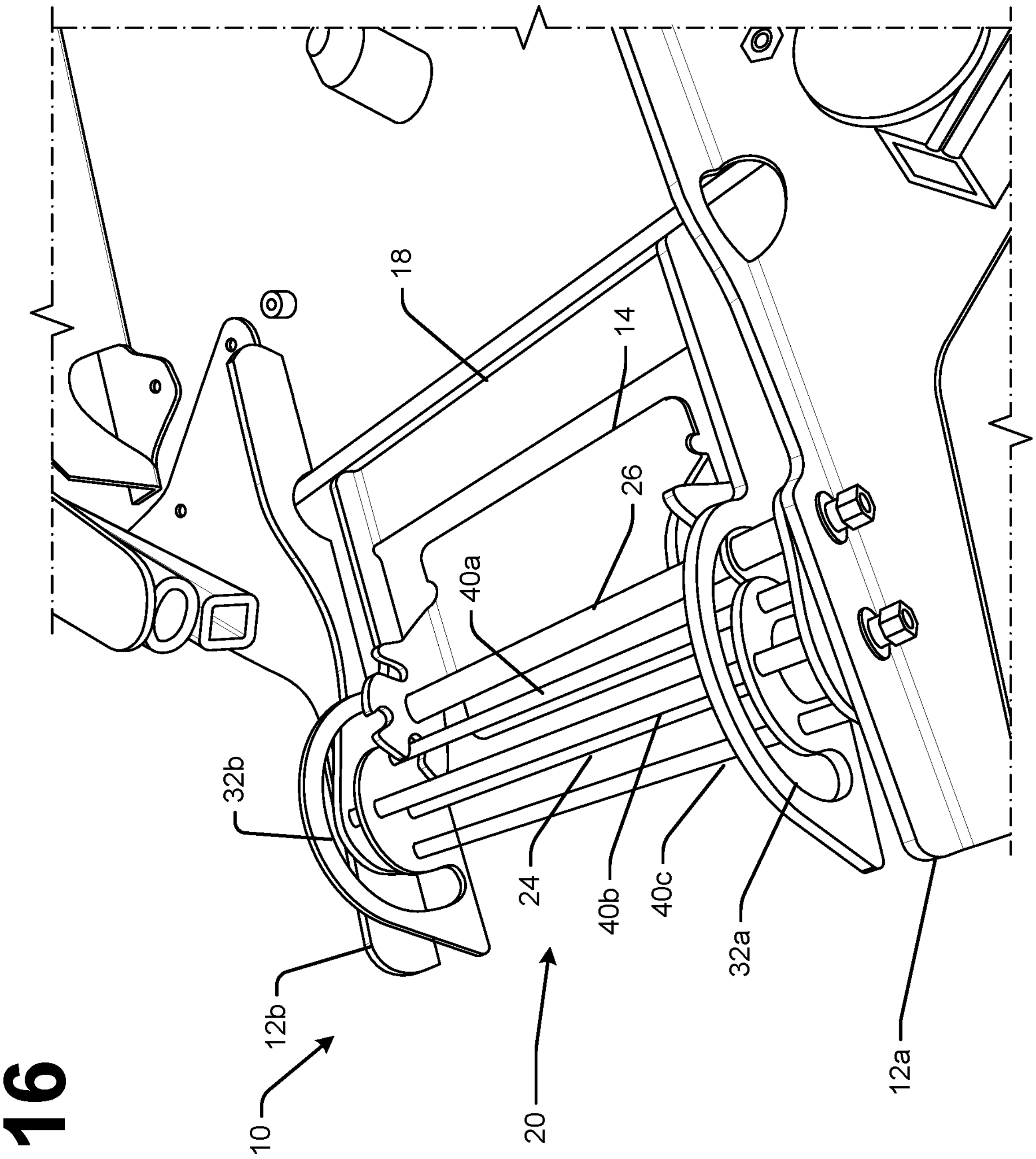
FIG. 16 is a bottom perspective view of the example secondary moving tag platen device corresponding to FIG. 15.

FIG. 15 is a top perspective view of the example secondary moving tag platen device 10 corresponding to FIG. 9, with the handle fully in the closed position. FIG. 16 is a bottom perspective view of the example secondary moving tag platen device 10 corresponding to FIG. 15. It is noted that the handle 18 and tag printing surface 16 have rotated about 180 degrees between the open position and the closed position. The operations shown in FIGS. 9-16 may be reversed to move the handle 18 and tag printing surface 16 back from the closed position to the open position (e.g., to unload and/or load another shirt).

In an example, the linking mechanism 20 is a rotating mechanism. In an example, the tag platen 14 moves automatically in response to movement of the handle 18. In an example, the top surface of the cross member 28 of the handle 18 and the printing surface 16 of the tag platen 14 rotate in opposite directions of one another.

In an example, the shafts 24 and 26 are operatively linked to one another. That is, movement of one of the shafts 24 or 26 moves the other shaft. In an example, movement of the handle 18 moves the tag platen 14. In an example, the linking mechanism 20 includes separate but corresponding or operatively linked shafts 24, 26. In an example, the tag platen 14 is mounted to rotate about a first axis member or shaft 24. The handle 18 is mounted to the second axis member or shaft 26 so that the rotation of the handle 18 rotates the second axis member 26.

In an example, a top surface of the cross member 28 of the handle 18 and a printing surface 16 of the tag platen 14 are in the same plane (e.g., in a downward facing orientation, as seen in FIGS. 9 and 10) when the handle 18 is in the open position. The top surface of the cross member 28 of the handle 18 and a printing surface 16 of the tag platen 14 are also in the same plane (e.g., but in an upward facing orientation, as seen in FIGS. 15 and 16) when the handle 18 is in the closed position. The positions between (FIGS. 11-14) the downward facing orientation (FIGS. 9 and 10) and the upward facing orientation (FIGS. 15 and 16) moves through approximately 180 degrees of rotation.

During an example operation, the linking mechanism 20 may be operated to move the handle 18 and the tag platen 14 between and an open position (shown in FIGS. 9-10) for loading a shirt onto the printing platen 1, and a closed position (as shown in FIG. 1, and also seen FIGS. 15-16) that holds the neck part of a shirt in the tag printing area 12 for a printing operation. The linking mechanism 20 may again be operated to move the handle 18 and the tag platen 14 back to the open position (FIGS. 9 and 10) to release the neck portion of the shirt and for loading another shirt onto the printing platen 1.

Figure 17:
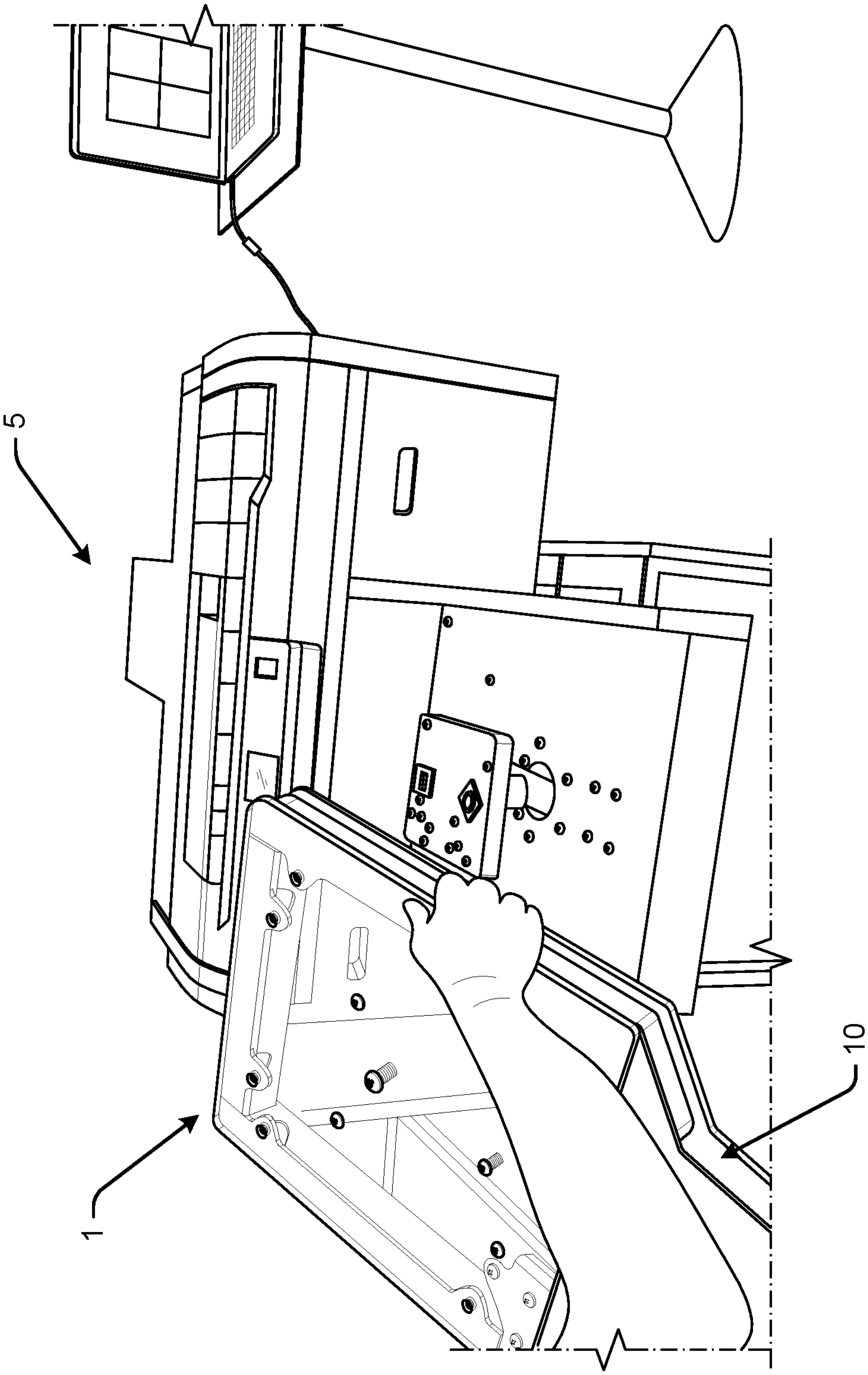
FIG. 17-30 are perspective views illustrating a shirt printing operation using the printing platen with secondary moving tag platen device.
Figure 18:
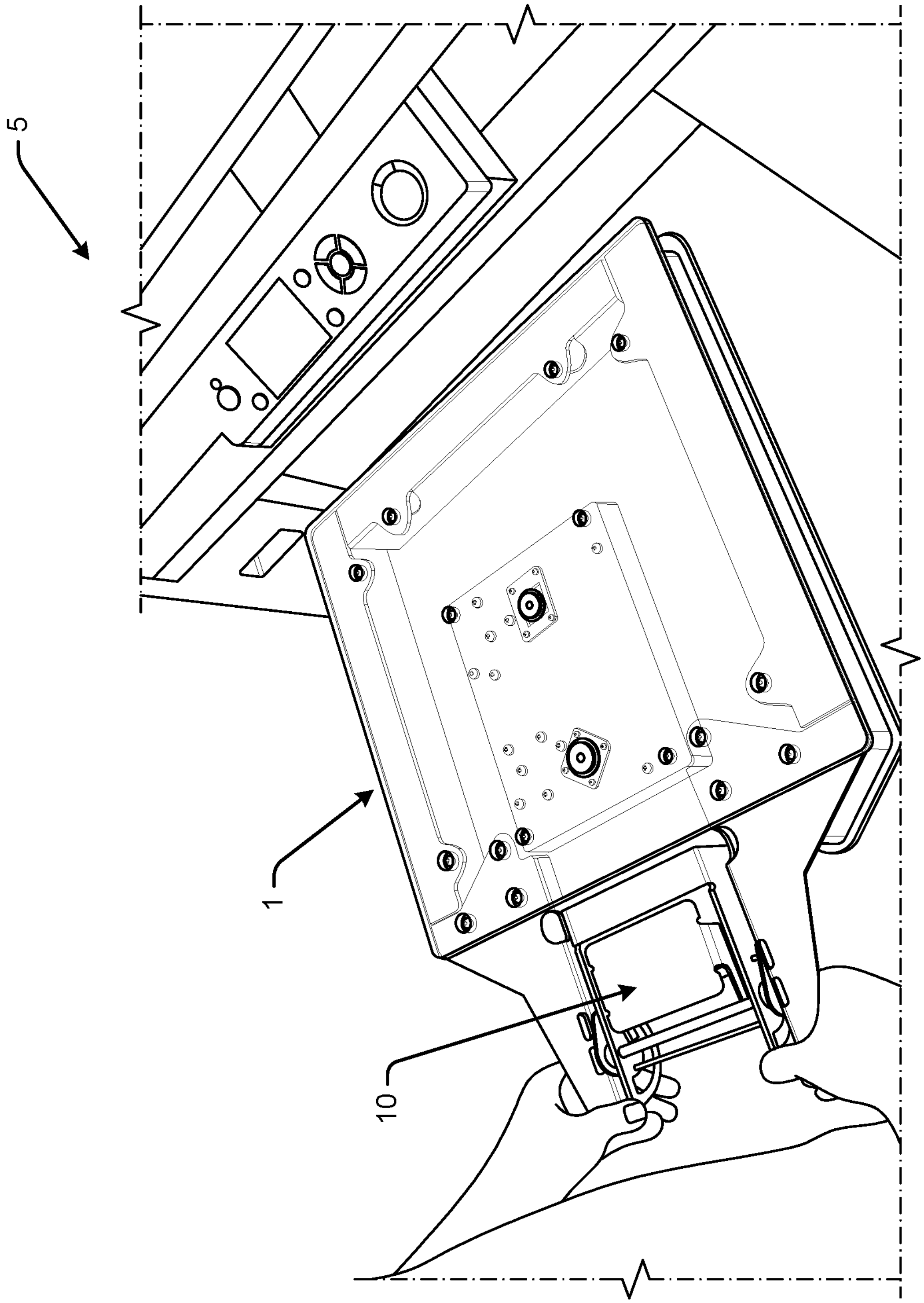
Figure 19:
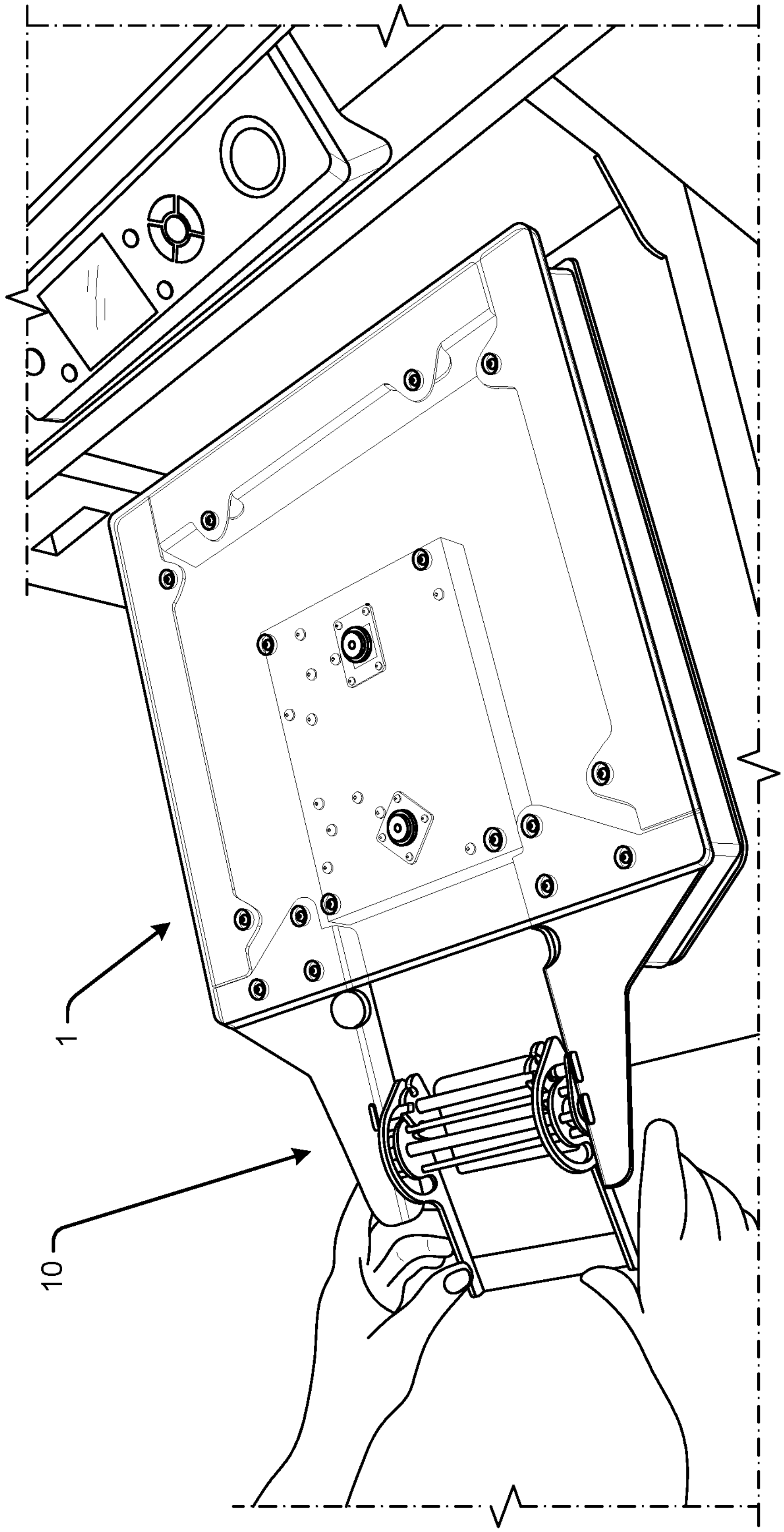
Figure 20:
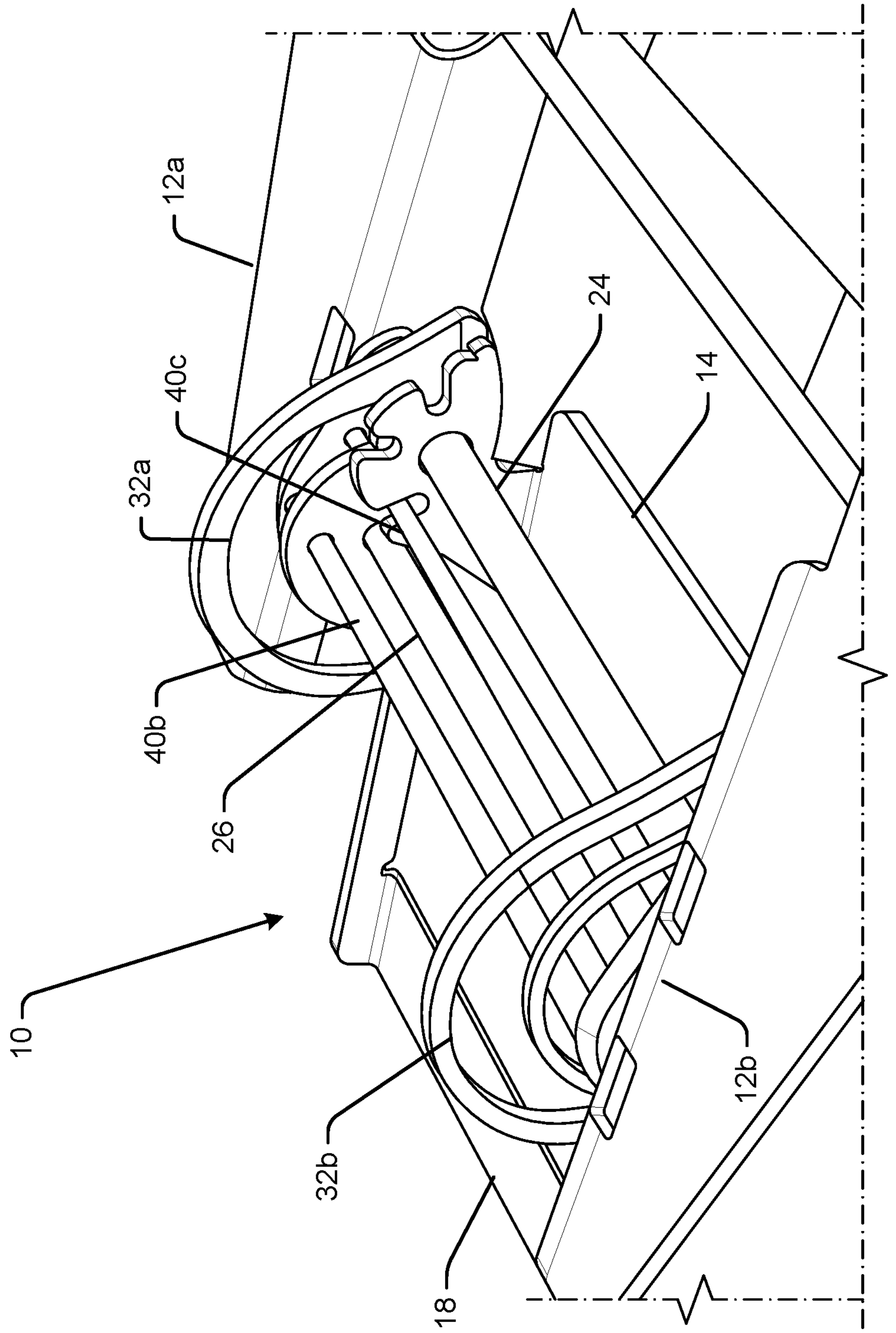

FIG. 17-30 are perspective views illustrating a t-shirt printing operation using the shirt printing platen with secondary moving tag platen device 10. During an example operation, the user places the entire platen device 1 (together with the secondary moving tag platen device 10) onto the flat surface of the printing machine 5, as seen in FIGS. 17 and 18. The printing surface 16 of the tag platen 14 should be in the open position (e.g., as shown in FIGS. 19 and 20, and corresponding to FIGS. 9 and 10) and be coplanar to the main printing surface of the platen device 1. The platen 1 is ready for loading a shirt 6 for a printing operation.

Figure 30:
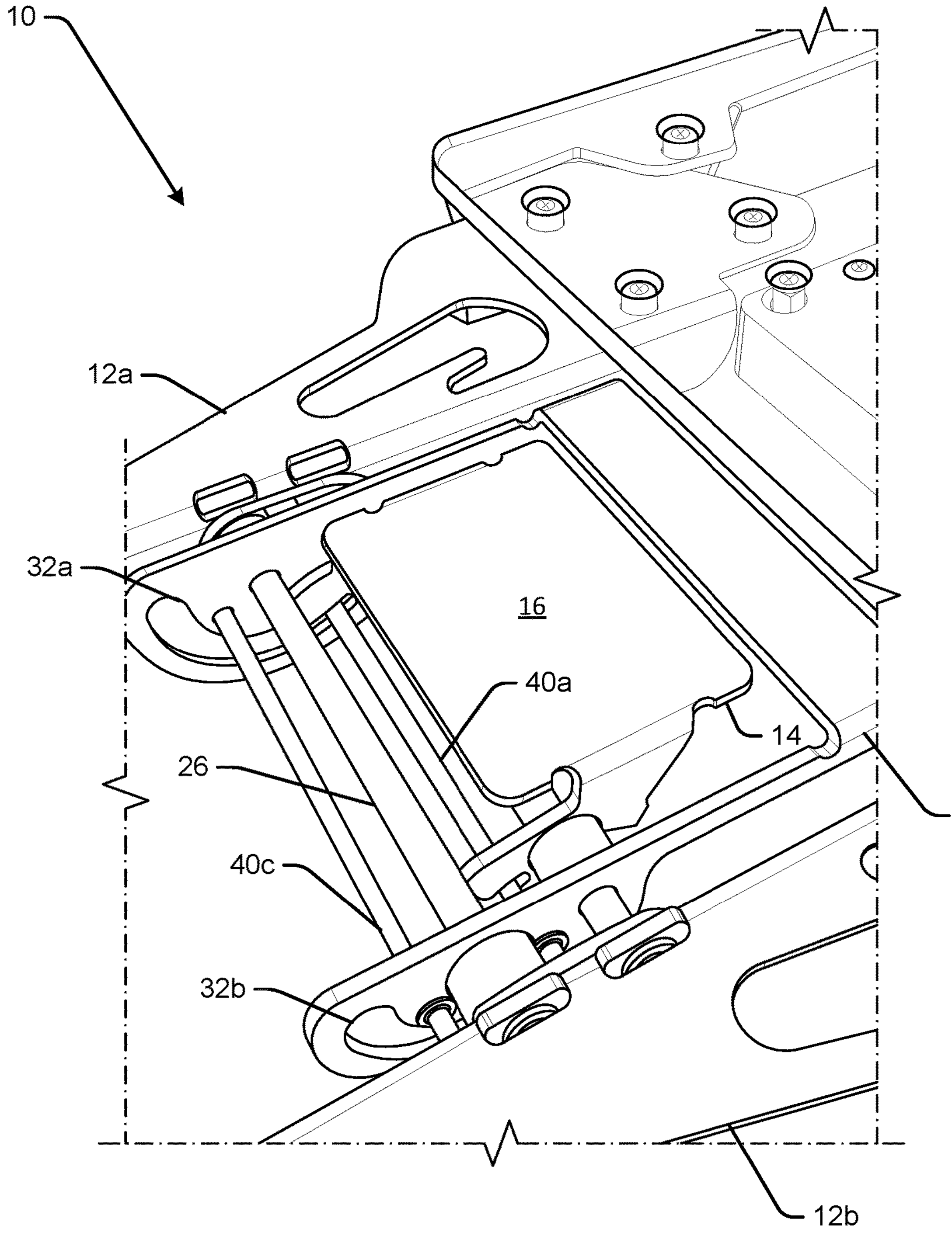

After loading the shirt 6 on platen device 1, the tag platen 14 can be rotated up (FIGS. 21-26) to hold the inside neck portion of the shirt 6 for printing in the tag area 7. The tag area 7 can be printed (e.g., with a label) when in the position shown in FIGS. 27-29. Maintaining the shirt 6 in this position with the tag area 7 helps keep wet ink on the tag area 7 from being smeared on the opposite side of the shirt 6 during the printing operation. After the print operation (on both the body of the shirt, and on the label or tag area 7), the tag platen 14 can be rotated (as illustrated in FIG. 30) back into the open position (with the tag platen surface 16 facing down) to release the neck portion of the shirt 6. The shirt 6 can be unloaded from the platen device 1.

An example operation of a secondary moving tag platen device 10 for a shirt printing platen 1 includes rotatably mounting the tag platen 14 on a first axis member 24 at a first fixed position on the shirt printing platen 1. The example operation also includes rotatably mounting the handle 18 on a second axis member 26 at a second fixed position on the shirt printing platen 1.

The example operation also includes rotating the handle 18 about the second axis member 26 so that the first axis member 24 travels along at least a portion of the arcuate shaped channels 32*a*, 32*b* in the handle 18 as the handle 18 moves between an open position and a closed position.

The example operation may also include indexing the tag platen 14 in conjunction with rotation of the handle 18 so that the tag platen 14 rotates into a shirt loading/unloading position when the handle 18 is moved to the open position. The example operation also includes indexing the tag platen 14 in conjunction with rotation of the handle 18 so that the tag platen 14 moves to a tag printing position when the handle 18 is moved to the closed position. In an example, indexing moves the tag platen 14 in an opposite direction of the handle 18.

In an example operation, a top surface of the handle 18 and a printing surface 16 of the tag platen 14 each move from the same plane in a downward facing orientation when the handle 18 is in the open position, to the same plane but in an upward facing orientation when the handle 18 is in the closed position.

In an example operation, the top surface of the handle 18 and the printing surface 16 of the tag platen 14 rotate approximately 180 degrees between the downward facing orientation and the upward facing orientation.

In an example, the top surface of the handle 18 and the printing surface 16 of the tag platen 14 rotate in opposite directions of one another.

In an example, the tag platen 14 automatically moves in response to manually moving the handle 18.

In an example, excess material of a shirt 6 is clamped between the handle 18 and the shirt printing platen 1 to keep the tag area of the shirt 6 flat and out of the way of a printing operation on the body of the shirt 6.

The operations shown and described herein are provided to illustrate example implementations. It is noted that the operations are not limited to the ordering shown. Still other operations may also be implemented.

Although a specific configuration is shown, other configurations are also contemplated as being within the scope of this disclosure, as will be readily apparent to those having ordinary skill in the art after becoming familiar with the teachings herein. By way of non-limiting illustration, the link between the handle 18 and the tag platen 14 may be geared, implemented through one or more linkage arm, driven by cable, belt, or pin/slot, to name only a few example link types. The example shirt printing platen with secondary moving tag platen device 10 may also be mounted on a single shaft, and unlinked from each other. Still other configurations are also contemplated.

It is noted that the examples shown and described are provided for purposes of illustration and are not intended to be limiting. Still other examples are also contemplated.

The invention claimed is:

1. A secondary moving tag platen device for a shirt printing platen, comprising:

a tag platen;

a first axis member for mounting at a first fixed position on the shirt printing platen, the tag platen rotatably mounted to the first axis member;

a handle having a cross member, a first leg, and a second leg;

a second axis member for mounting at a second fixed position on the shirt printing platen, the handle rotatably mounted to the second axis member; and a linking mechanism between the first axis member and the second axis member to rotate the tag platen in conjunction with rotation of the handle, the tag platen configured to move to a shirt loading/unloading position when the handle is moved to an open position, and the tag platen configured to move to a tag printing position when the handle is moved to a closed position.

2. The secondary moving tag platen device of claim 1, wherein the linking mechanism further comprises:

a first arcuate shaped channel formed in the first leg of the handle, and a second arcuate shaped channel formed in the second leg of the handle, the first axis member of the tag platen extending through the first arcuate shaped channel and the second arcuate shaped channel, the first axis member of the tag platen configured to travel along a length of the first arcuate shaped channel and the second arcuate shaped channel when the handle is rotated about the second axis member between the open position and the closed position; and at least one shaft mounted between the first leg of the handle and the second leg of the handle, the at least one shaft moving in the direction of the handle.

3. The secondary moving tag platen device of claim 2, wherein the linking mechanism is an indexing mechanism including at least one tooth mounted to the first axis member of the tag platen, the at least one tooth configured to move in the direction of the tag platen.

4. The secondary moving tag platen device of claim 3, wherein the at least one tooth of the tag platen configured to move in an opposite direction of the at least one shaft of the handle.

5. The secondary moving tag platen device of claim 1, wherein a top surface of the cross member of the handle and a printing surface of the tag platen are in the same plane in a downward facing orientation when the handle is in the open position.

6. The secondary moving tag platen device of claim 5, wherein the top surface of the cross member of the handle and a printing surface of the tag platen are in the same plane in an upward facing orientation when the handle is in the closed position.

7. The secondary moving tag platen device of claim 6, wherein the top surface of the cross member of the handle and the printing surface of the tag platen are configured to rotate approximately 180 degrees between the downward facing orientation and the upward facing orientation.

8. The secondary moving tag platen device of claim 7, wherein the top surface of the cross member of the handle and the printing surface of the tag platen are configured to rotate in opposite directions of one another.

9. The secondary moving tag platen device of claim 1, wherein the tag platen is configured to move automatically in response to movement of the handle.

10. The secondary moving tag platen device of claim 1, wherein the handle in the closed position is configured to clamp excess material of a shirt onto the shirt printing platen to keep the shirt flat and out of the way during a printing operation.

11. The secondary moving tag platen device of claim 1, wherein the linking mechanism includes a plurality of separate shafts individually mounted between the first leg of the handle and the second leg of the handle, the plurality of separate shafts each configured to move in the same direction as the handle.

12. The secondary moving tag platen device of claim 11, wherein the linking mechanism is an indexing mechanism including a plurality of teeth mounted to the first axis member of the tag platen, the plurality of teeth configured to mate with the plurality of separate shafts to rotate the tag platen in a direction opposite of the handle.

13. A method of providing a secondary moving tag platen device for a shirt printing platen, comprising:

rotatably mounting a tag platen at a first fixed position on the shirt printing platen;

rotatably mounting a handle at a second fixed position on the shirt printing platen;

rotating the handle between an open position and a closed position;

indexing the tag platen in conjunction with rotation of the handle so that the tag platen rotates into a shirt loading/unloading position when the handle is moved to the open position; and linking movement of the tag platen in conjunction with movement of the handle so that the tag platen moves to a tag printing position when the handle is moved to the closed position.

14. The method of claim 13, further comprising:

moving a top surface of the handle and a printing surface of the tag platen from the same plane in a downward facing orientation when the handle is in the open position to the same plane in an upward facing orientation when the handle is in the closed position;

wherein the linking movement is an indexing movement that moves the tag platen in an opposite direction of the handle.

15. The method of claim 14, further comprising rotating the top surface of the handle and the printing surface of the tag platen approximately 180 degrees between the downward facing orientation and the upward facing orientation.

16. The method of claim 15, further comprising:

rotating the top surface of the handle and the printing surface of the tag platen in opposite directions of one another; and automatically moving the tag platen in response to manually moving the handle.

17. The method of claim 13, further comprising clamping excess material of a shirt between the handle and the shirt printing platen to keep the shirt flat and out of the way of a printing mechanism.

18. A secondary moving tag platen device for a shirt printing platen, comprising:

means for rotatably mounting a tag platen at a first fixed position on the shirt printing platen;

means for rotatably mounting a handle at a second fixed position on the shirt printing platen;

means for rotating the handle between an open position and a closed position;

means for indexing the tag platen in conjunction with rotation of the handle so that the tag platen rotates into a shirt loading/unloading position when the handle is moved to the open position; and means for linking movement of the tag platen in conjunction with movement of the handle so that the tag platen moves to a tag printing position when the handle is moved to the closed position.

19. A secondary moving tag platen device for a shirt printing platen, comprising:

a tag platen rotatably mounted at a first fixed position on the shirt printing platen;

a handle rotatably mounted at a second fixed position on the shirt printing platen, the handle configured to rotate between an open position and a closed position to index the tag platen in conjunction with rotation of the handle so that the tag platen rotates into a shirt loading/unloading position when the handle is moved to the open position; and a linking mechanism for linking movement of the tag platen in conjunction with movement of the handle so that the tag platen moves to a tag printing position when the handle is moved to the closed position.

* * * * *